United States Patent
Bechtel et al.

(10) Patent No.: US 7,432,967 B2
(45) Date of Patent: *Oct. 7, 2008

(54) CONTROL CIRCUIT FOR IMAGE ARRAY SENSORS

(75) Inventors: Jon H. Bechtel, Holland, MI (US); Joseph S. Stam, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 1043 days.

This patent is subject to a terminal disclaimer.

(21) Appl. No.: 10/274,637

(22) Filed: Oct. 21, 2002

(65) Prior Publication Data

US 2003/0058346 A1    Mar. 27, 2003

Related U.S. Application Data

(63) Continuation of application No. 09/448,364, filed on Nov. 23, 1999, now Pat. No. 6,469,739, which is a continuation of application No. 08/933,210, filed on Sep. 16, 1997, now Pat. No. 5,990,469, which is a continuation-in-part of application No. 08/831,232, filed on Apr. 2, 1997, now Pat. No. 5,837,994.

(51) Int. Cl.
  *H04N 5/335* (2006.01)
(52) U.S. Cl. .................................. 348/294; 348/300
(58) Field of Classification Search .............. 348/231.6, 348/220, 300, 294, 207.99, 220.1
  See application file for complete search history.

(56) References Cited

U.S. PATENT DOCUMENTS

| | | | |
|---|---|---|---|
| 4,891,559 A | 1/1990 | Matsumoto et al. | |
| 5,402,170 A | 3/1995 | Parulski et al. | |
| 5,452,004 A | 9/1995 | Roberts | |
| 5,475,441 A | 12/1995 | Parulski et al. | |

(Continued)

FOREIGN PATENT DOCUMENTS

DE        3744128        12/1987

(Continued)

OTHER PUBLICATIONS

Panicacci R.A. et al., "128Mb/s Multiport CMOS Binary Active-Pixel Image Sensor," IEEE International Solid State Circuits Conference, vol. 39, Feb. 1996, p. 100/101, 427, XP 000685556.

(Continued)

*Primary Examiner*—Tuan V Ho
(74) *Attorney, Agent, or Firm*—Price, Heneveld, Cooper, DeWitt & Litton, LLP

(57) ABSTRACT

A control system is disclosed for controlling an image array sensor and controlling communication between the image array sensor and a microcontroller by way of a serial communication interface. The control system is able to efficiently control various aspects of the image array sensor such as windowing, mode of operation, sensitivity as well as other parameters in order to reduce the data throughput. An important aspect of the invention relates to the fact that the control circuit can be rather easily and efficiently configured in CMOS with relatively few output pins which enables the control circuit to be rather easily and efficiently integrated with CMOS based image array sensors and even the microcontroller to reduce the part count and thus, the overall cost of the system.

31 Claims, 19 Drawing Sheets

U.S. PATENT DOCUMENTS

| | | |
|---|---|---|
| 5,796,094 A | 8/1998 | Schofield et al. |
| 5,831,258 A | 11/1998 | Street |
| 5,837,994 A | 11/1998 | Stam et al. |
| 5,867,214 A | 2/1999 | Anderson et al. |
| 6,005,613 A | 12/1999 | Endsley et al. |

FOREIGN PATENT DOCUMENTS

| | | |
|---|---|---|
| EP | 0178954 | 6/1985 |
| WO | 9724728 | 7/1997 |

OTHER PUBLICATIONS

Bart Dierickx et al., "Random Addressable Active Pixel Image Sensors," Proceedings of the SPIE, vol. 2950, Oct. 9-10, 1996, pp. 2-7, XP 002089617.

D. Uwaerts, "80166 Microcontroller Board for FUGA-Camera's," IMEC, Leuven, Belgiuma, Jul. 29, 1997, XP 002089618.

Woodward Yang, "Circuit Integration Pushes Sensor Performance," Laser Focus World, Feb. 1997, pp. 129, 131, 133-134, 136, 138-139, XP 002089619.

"PCMCIA Video Camera for Mobile Computing," Electronic Engineering, vol. 66, No. 814, Oct. 1, 1994, p. 22, XP 000471385.

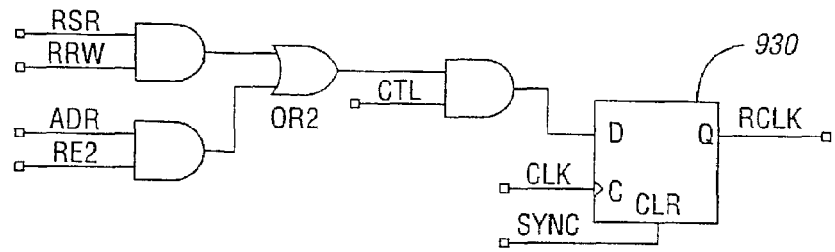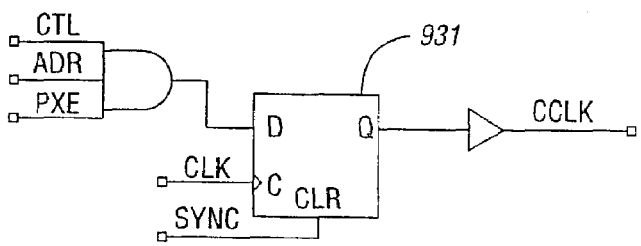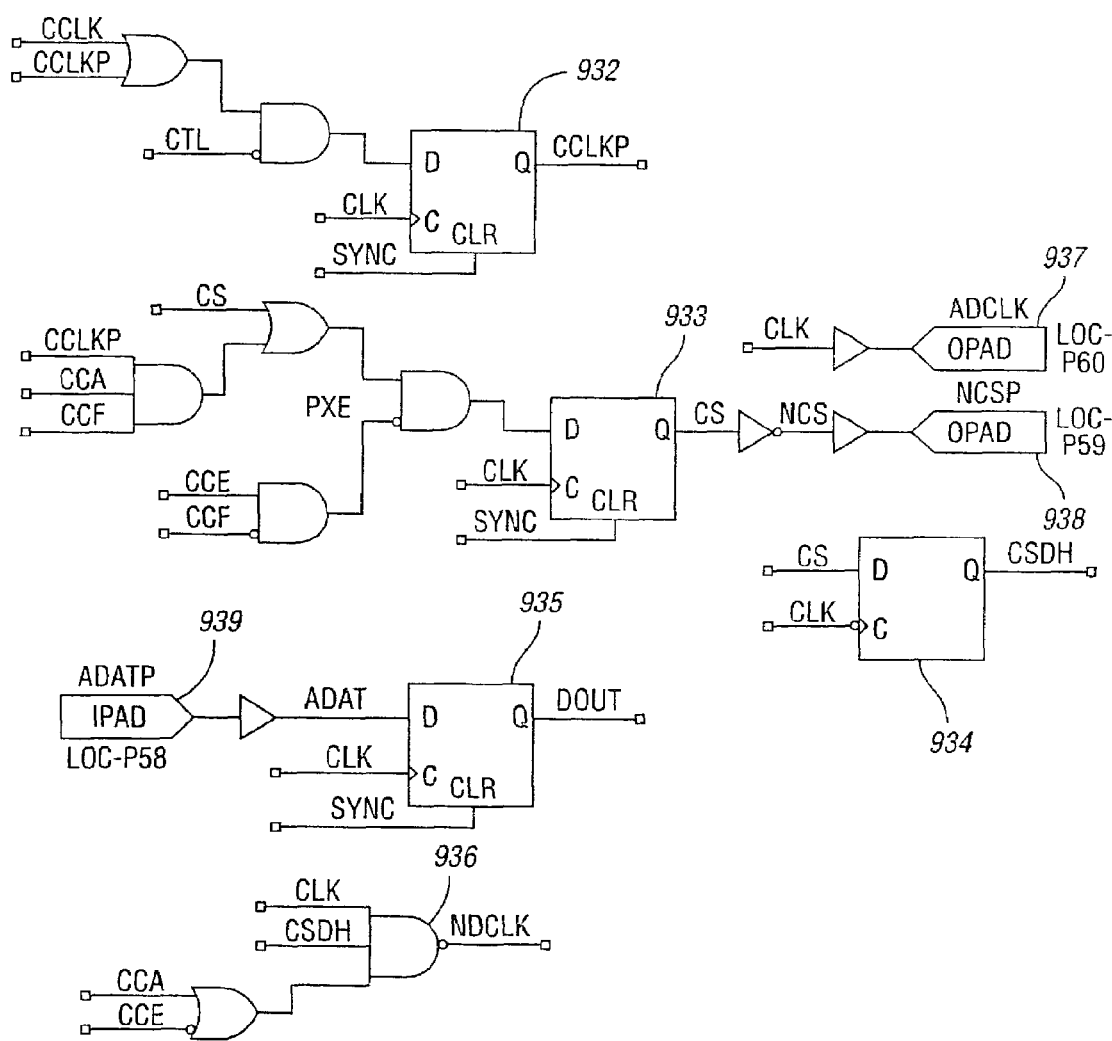
Fig. 12f

CONTROL CIRCUIT FOR IMAGE ARRAY SENSORS

CROSS-REFERENCE TO RELATED APPLICATIONS

This application is a continuation of U.S. patent application Ser. No. 09/448,364 filed on Nov. 23, 1999, entitled "CONTROL CIRCUIT FOR IMAGE ARRAY SENSORS," by Jon H. Bechtel et al., now U.S. Pat. No. 6,469,739, which is a continuation of U.S. patent application Ser. No. 08/933,210 filed on Sep. 16, 1997, entitled "CONTROL CIRCUIT FOR IMAGE ARRAY SENSORS," by Jon H. Bechtel et al., now U.S. Pat. No. 5,990,469, which is a continuation-in-part of U.S. patent application Ser. No. 08/831,232, filed on Apr. 2, 1997, entitled "CONTROL SYSTEM TO AUTOMATICALLY DIM VEHICLEAD HEADLAMPS," by Joseph S. Stam et al., now U.S. Pat. No. 5,837,994, the entire disclosure of each of the above applications is incorporated herein by reference.

BACKGROUND OF THE INVENTION

The present invention relates to a control system and more particularly to a control system for controlling an image array sensor having a predetermined number of pixels and controlling communication between the image array sensor and a microcontroller by way of a serial communication interface which allows various subsets of the pixels or subwindows as well as the mode of operation of the image array sensor to be efficiently and economically controlled by way of a circuit that is adapted to be formed as an application specific integrated circuit (ASIC) and even integrated with the image array sensor and the microcontroller to form a custom IC.

Image array sensors are generally known in the art. Both photogate and photodiode image array sensors are known. Examples of such image array sensors are disclosed in U.S. Pat. Nos. 5,386,128 and 5,471,515 and 2/SPIE VOL. 1900, "ACTIVE PIXEL SENSORS: ARE CCD'S DINOSAURS?" by Eric R. Fossum, pages 2-14, July 1993, hereby incorporated by reference. Active pixel image array sensors are also known, for example, as manufactured by PHOTOBIT LLC, La Crescenta, Calif. Such active pixel image array sensors are normally provided with a predetermined number of pixels forming a window, for example, a 50×50 window.

There are several important control considerations related to such active pixel image array sensors. One important consideration relates to what is commonly known as a windowing function. A windowing function relates to the ability to control the images of subwindows within the image array sensor for various purposes. For example, in the above-identified U.S. Pat. No. 5,837,994, an active pixel image array sensor is used for headlamp and tail lamp sensing as part of an automatic headlamp dimming system. That system utilizes an optical system for imaging tail lamps and headlamps on different portions of the image array sensor. More particularly, in one embodiment of the invention, the image sensor is divided up into virtually two identically sized independently positioned subwindows in one frame through different filters, one for imaging headlamps and the other for imaging tail lamps. In such an application, one row may be scanned from the first subwindow and a corresponding row from the other window. The process is repeated until all of the rows in the subwindows have been scanned.

The windowing function may also be used to control the data throughput of the system. For example, in the application discussed above, it is necessary to discriminate noise, such as road signs and street lamps. In such an application, a harmonic analysis may be used to determine if an AC power line voltage is present. In such an application, the strongest harmonic is normally 120 Hz for 60 Hz line voltage in the U.S. and a 100 Hz for 50 Hz line voltage in Europe. In order to utilize a Fourier series analysis to detect the 100 and 120 Hz frequency components, the data must be sampled at a rate, which is generally more than twice either frequency, and divides equally into 1/50 second and 1/60 second full cycle. For example, 6 uniformly spaced samples may be taken at a rate of 300 samples per second for the 50 Hz line frequency and 5 samples at the same 300 sample per second rate for a 60 Hz line frequency. The 300 sample per second rate is about 10 times the usual 30 sample per second frame rate often used for video cameras. To avoid excessively high data throughput rates, the frame size may be limited to a relatively small size, for example, as small as 2 pixels by 2 pixels.

The windowing feature can also be used for alignment of the system. For example, as discussed in the above-identified co-pending application, a useful field of view for sensing oncoming headlamps of an approaching vehicle is approximately 10° in elevation by 30° in width. However, in such a system, it is preferable to allow for some error in the optical alignment of the sensor within the vehicle. For example, a sensor with a 13° elevational field of view may be provided to allow for a 3° misalignment and still view the proper 10° elevational range. The windowing feature allows the required 10° field of view to be scanned reducing, for example, better than 20 percent of the image processing data throughput for the function. In particular, in order to obtain a proper field of view, a calibration measurement may be taken after the system is mounted. The field of view may also be based on the average position of the image of oncoming headlamps or on an average of the position of a portion of the roadway normally illuminated by the controlled vehicle's own headlamps which enables the system to dim the controlled vehicle's headlamps based upon an oncoming vehicle whose headlamps normally appear at an elevation, normally only a few degrees above the upper extent of the portion of the roadway illuminated by the controlled vehicle's own headlamps.

Another important consideration in an application utilizing an active pixel image array sensor is the ability to control the sensitivity of the device. For certain applications, for example, as disclosed in the above-mentioned co-pending application, it may be necessary to adjust the sensitivity of the system in order to avoid saturation of the image array sensor. For example, in such an application, the image of headlamps from an oncoming vehicle appears as bright spots in the field of view. If the sensitivity of the image array sensor is set too high, the particular pixels which image the headlamps will saturate so that the actual intensity cannot be determined. In such a situation, since the intensity of the headlamp image is a general indicator of the distance of an oncoming vehicle, such information is lost. Secondly, the bright image of the headlamps from an oncoming vehicle is a good indication to the system that the sensed image is from an oncoming vehicle rather than being illuminated or reflected from an object illuminated by the controlled vehicle's own headlamps.

As such, there is a need to provide improved control of the window size as well as the modes of operation for such active image array sensors. In addition to sensitivity and mode of operation adjustments, other parameters, such as the frame read repetition timing and the number of frames to be read, also need to be controlled. Thirdly, an important consideration is the ability to make such changes rather rapidly.

Another important consideration with such systems is the rather limited space for such control circuits. For example, the automatic headlamp dimming system, disclosed and described in the above-mentioned co-pending application, is preferably located in the housing which shares a mounting bracket with the rearview mirror. In such an application, space is rather limited. Moreover, as with any control circuit, it is always preferred to reduce the number of components in the circuit which normally reduces the cost considerably. For example, the active pixel image array sensors as discussed above are based on CMOS technology. Accordingly, there is a need to develop circuitry which can be integrated with the image array sensor as well as the microcontroller itself.

SUMMARY OF THE INVENTION

It is an object of the present invention to solve various problems associated with the prior art.

It is yet a further object of the present invention to provide a control system for an image array sensor.

It is yet a further object of the present invention to provide a control system for controlling the communication between an image array sensor and a microcontroller.

It is yet a further object of the present invention to provide a control circuit for controlling various functions of an image array sensor, such as an active pixel image array sensor.

Briefly, the present invention relates to a control system for controlling an image array sensor and controlling communication between the image array sensor and a microcontroller by way of a serial communication interface. The control system is able to efficiently control various aspects of the image array sensor, such as windowing, mode of operation, sensitivity, as well as other parameters in order to reduce the data throughput. An important aspect of the invention relates to the fact that the control circuit can be rather easily and efficiently configured in CMOS with relatively few output pins which enables the control circuit to be rather easily and efficiently integrated with CMOS-based image array sensors as well as a microcontroller to reduce the part count and thus the overall cost of the system.

BRIEF DESCRIPTION OF THE DRAWINGS

These and other objects of the present invention will be readily understood with reference to the following specification and attached drawings, wherein:

FIG. 6 is an overall flow diagram of the image processing in accordance with the present invention;

FIGS. 10a-10c are schematic diagrams of the block diagram illustrated in FIG. 9;

FIGS. 12d-12g are schematic diagrams of the CanCtrl portion of the control circuit in accordance with the present invention.

DETAILED DESCRIPTION

The present invention relates to a control system for controlling an image array sensor, such as an active pixel image array sensor, as described above, for example, a PHOTOBIT photodiode image array sensor, and providing a relatively efficient serial communication interface with a microcontroller. Although the system is described and illustrated with reference to a photodiode image array sensor, the principles of the present invention are also applicable to other image array sensors, such as photogate-type image array sensors, for example, as described above. The control system described below is adapted to be integrated with existing CMOS image array sensors and even a microcontroller. The serial communication interface between the microcontroller and the image array sensor provides for a relatively low pin count device. For example, an embodiment may integrate the control logic; the programmable row, column, and timing controller; the photo array sensor and associated biasing network; and the amplifier and analog to digital converter which represent blocks 1, 2, 3, and 4 of FIG. 9. Integration of these functions leaves only the microcontroller block 5 as a major separate block. A ground pin, a V+ supply pin, an oscillator input pin, and three pins for a serial interface to the microcontroller may be all of the pins which are required. Even with a V− supply and a serial output pin for a diagnostic function, this requires only 8 pins.

The control system in accordance with the present invention is illustrated in FIGS. 9-12g. An exemplary application of the control system in accordance with the present invention is illustrated in FIGS. 1-8. However, it is to be understood that the principles of the invention are not limited to such an application. In particular, the control system in accordance with the present invention is adapted to be utilized in virtually any application of an image array sensor in which one or more of the image array sensor parameters, such as window size, frame and the various other parameters described above, need to be controlled, for example, as described in U.S. Pat. No. 5,990,469, entitled "MOISTURE SENSOR AND WINDSHIELD FOG DETECTOR" by Joseph S. Stam et al.

Automatic Headlamp Dimming System

Figures 1, 2:
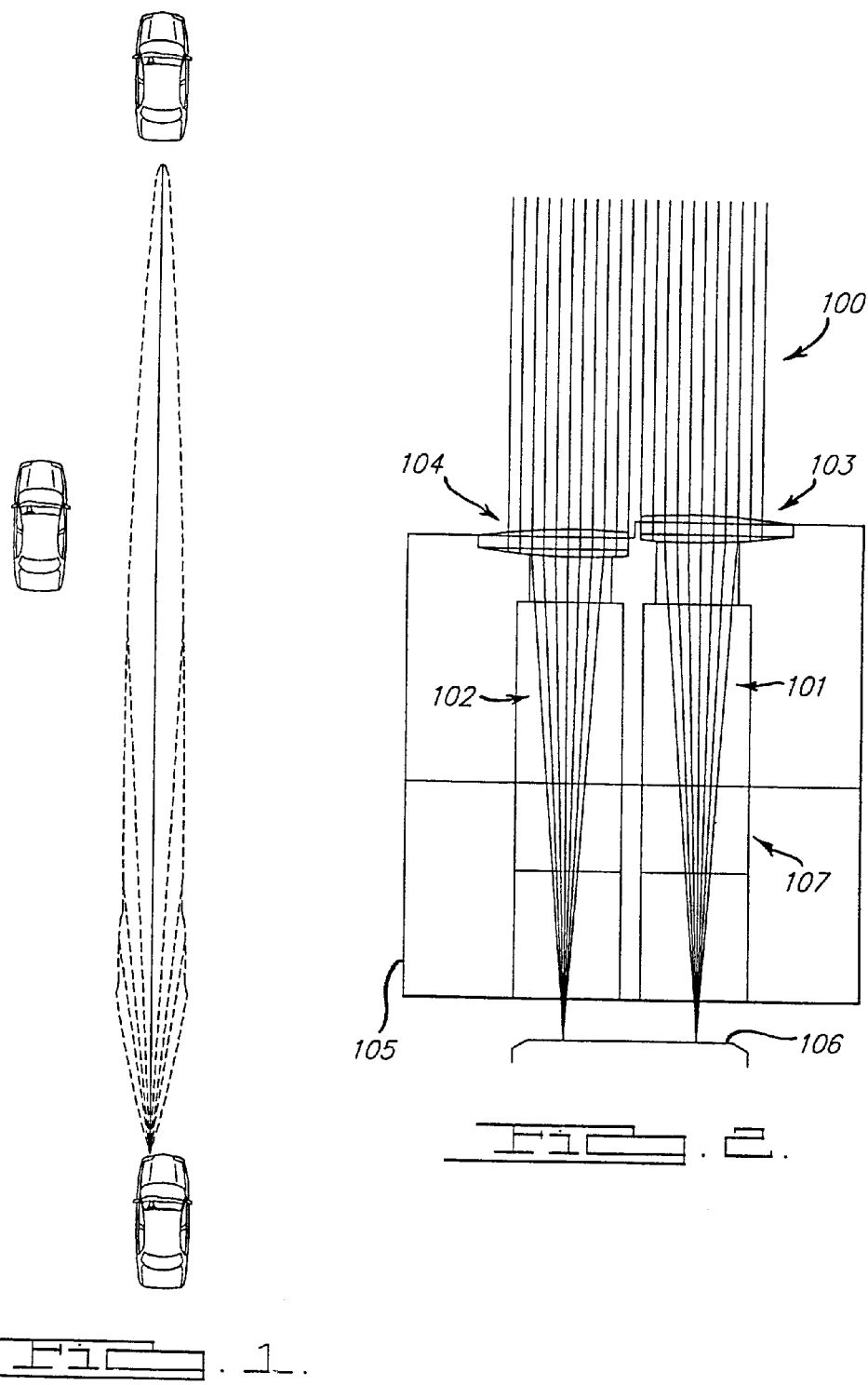
FIG. 1 is a top view illustrating the headlamp emission pattern of a conventional high beam headlamp.
FIG. 2 is a side cross-sectional view of the optical system which forms a part of the present invention illustrating light rays incident at a vertical angle within the desired field of view.
Figure 3:
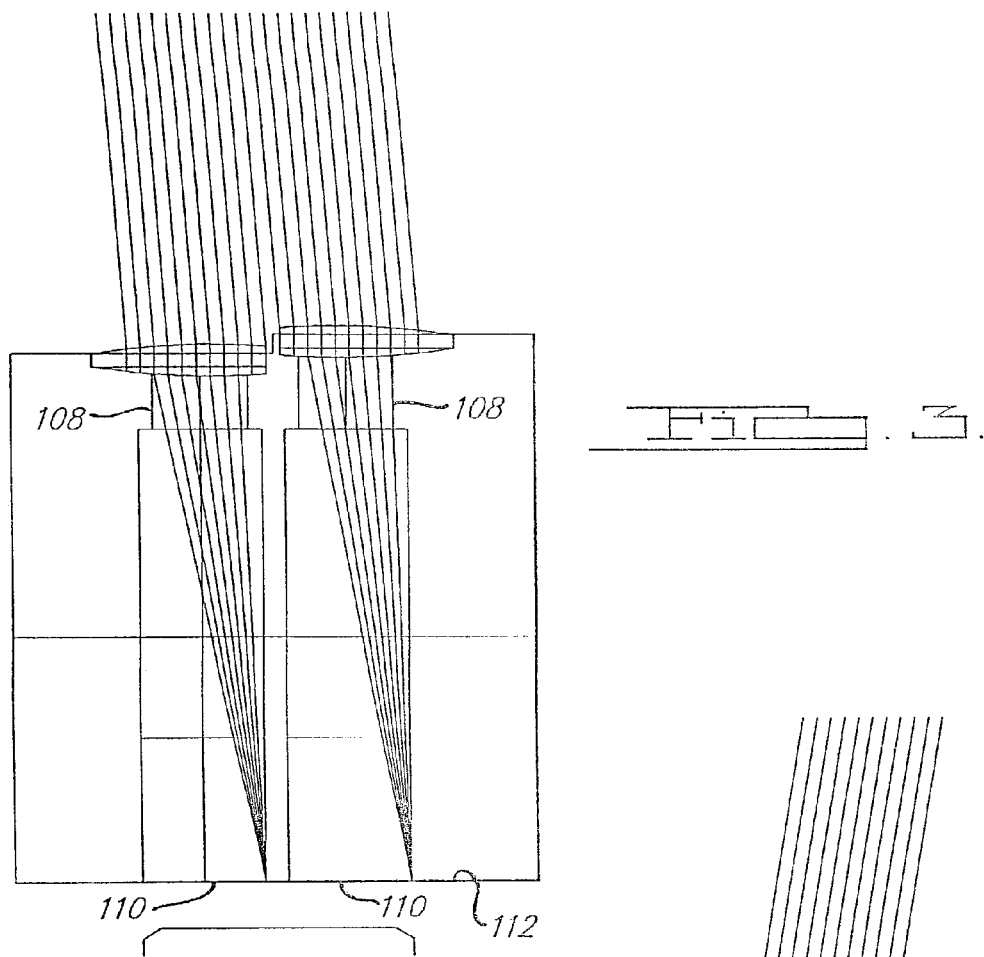
FIG. 3 is similar to FIG. 2 illustrating the light rays incident at a vertical elevation angle beyond the desired field of view.
Figure 4:
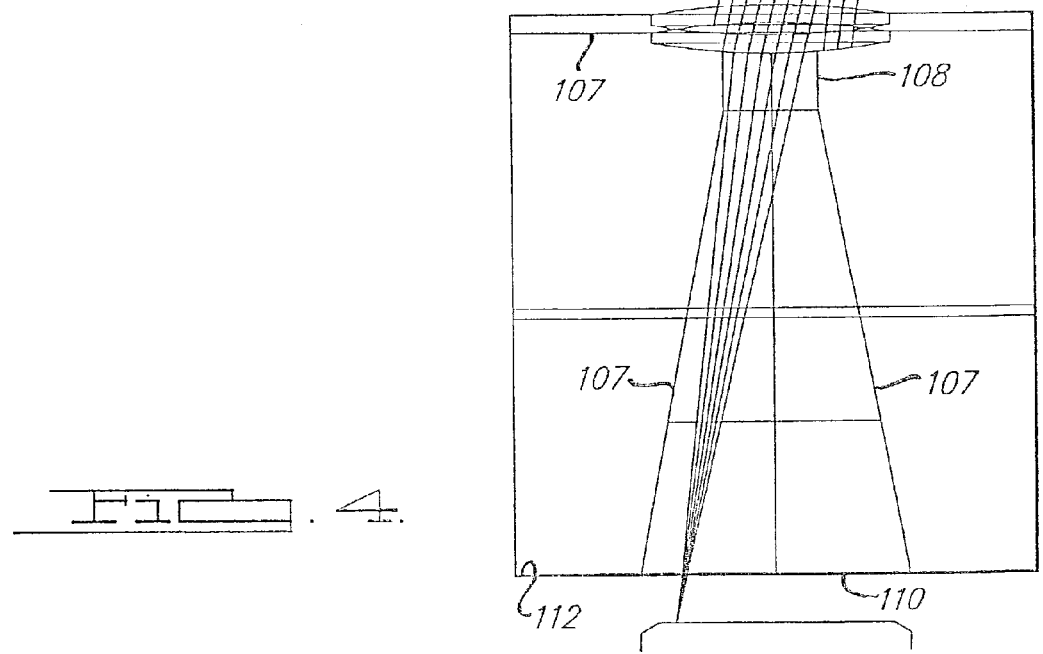
FIG. 4 is a top cross-sectional view of the optical system illustrated in FIG. 2 illustrating the light rays at a horizontal angle within the desired field of view.
Figure 5:
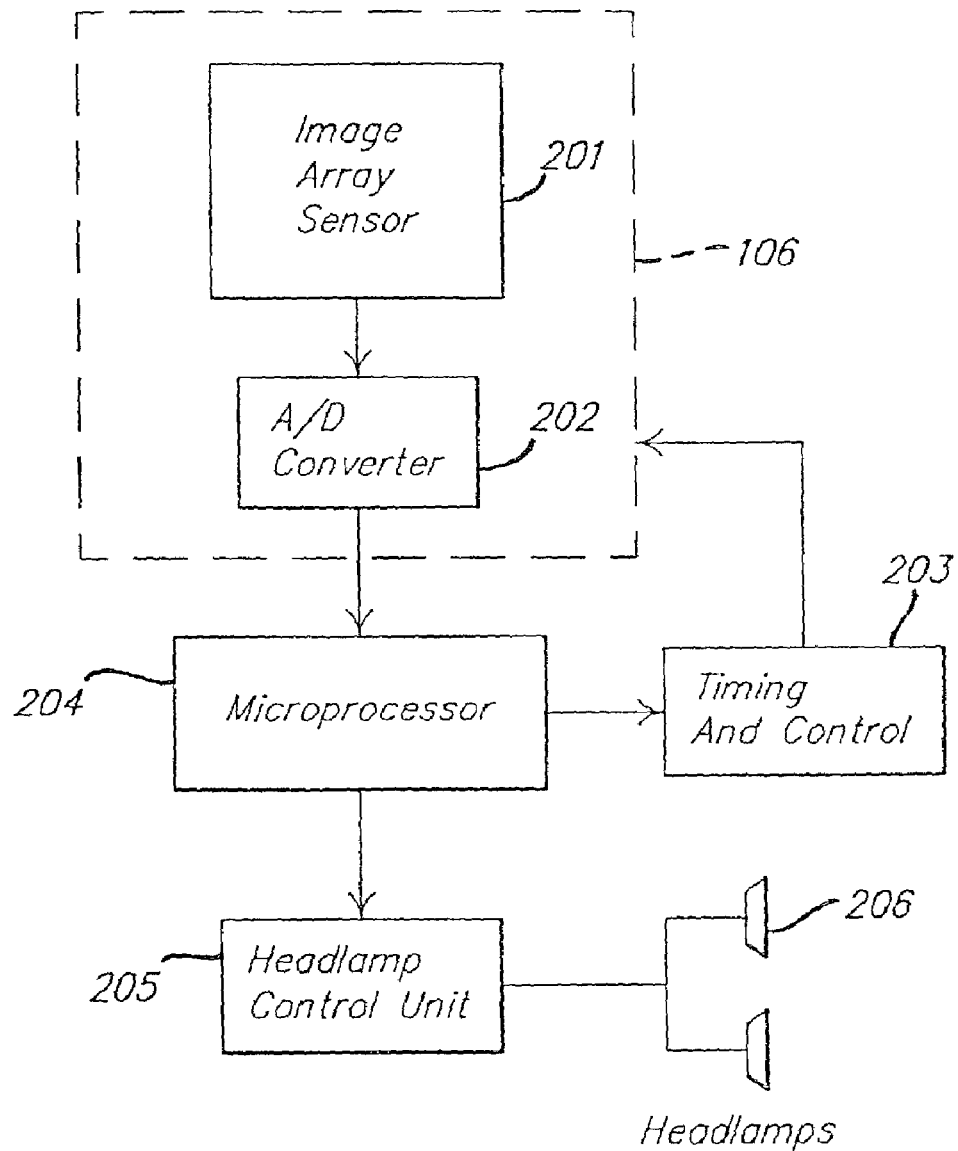
FIG. 5 is a block diagram of the automatic headlight dimming system in accordance with the present invention.
Figure 3:
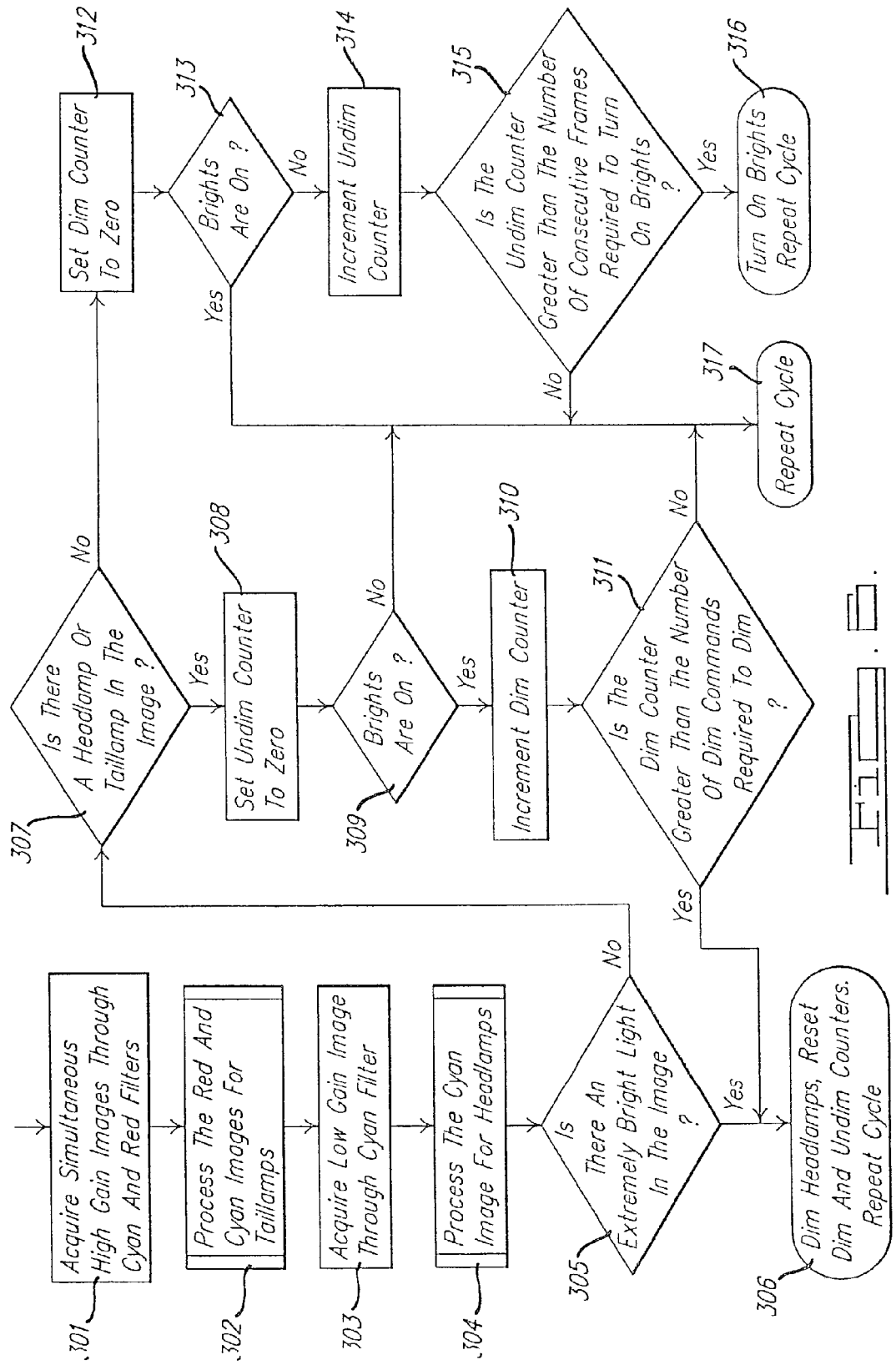

An automatic headlamp dimming system is adapted to provide automatic headlamp dimming in accordance with the Department of Transportation (DOT) regulations to provide an intensity of 40,000 cd at 3°, 32,050 cd at 6°, 1,500 cd at 9°, and 750 cd at 12°. An example of such an emission pattern is illustrated in FIG. 1. The automatic headlamp dimming system, which may be used with the present invention, includes an optical system as illustrated in FIGS. 2-4 and an image processing system as illustrated in FIGS. 5-8. In order to enable the high beam headlamps to remain on for the longest reasonable time without subjecting the driver of another vehicle to excessive glare, the automatic headlamp dimming system in accordance with the present invention controls the vehicle high beam headlamps as a function of the distance as well as the horizontal angular position of the other vehicle relative to the controlled vehicle. As will be discussed in more detail below, the optical system is adapted to discriminate between headlamps and tail lamps of other vehicles. The light rays from the headlamps and tail lamps of other vehicles are spatially segregated on a pixel sensor array to provide increased discrimination of headlamps and tail lamps relative to other ambient light sources, such as road signs and reflections from snow and the like. The optical system enables both the horizontal and vertical position of incident light sources to be determined within the field of view of the optical system. The image processing system processes the pixels to provide for automatic control of the headlamps as a function of the distance and horizontal angular position of another vehicle relative to the control vehicle. As such, the system in accordance with the present invention is adapted to provide optimal control of the vehicle high beam headlamps by allowing the high beam headlamps to remain on for as long as possible while preventing the driver of the other vehicle from being subjected to an undue amount of glare.

Optical System

Referring to FIGS. 2-4, the optical system includes a pair of lenses 103 and 104, a lens holder 105 and an image array sensor 106. As best shown in FIGS. 2 and 3, the lenses 103 and 104 are vertically spaced apart in order to allow imaging of the same field of view onto different portions of the array. The lenses 103, 104 image generally the same fields of view because the distance between the lenses 103, 104 is small relative to the light sources within the field of view of the device.

The lens 103 may be formed with a red filter dye for transmitting light with wavelengths greater than 600 nm and focusing red light rays 101 from tail lamps onto one-half of the image array sensor 106. The red filter dye causes the lens 103 to absorb all light rays at the blue end of the visible spectrum and transmit light rays at the red end of the spectrum. As such, the amount of light transmitted from non-red light sources, such as headlamps, is greatly reduced while light rays from tail lamps are fully transmitted through the lens 103. As such, the relative brightness of the light rays from tail lamps imaged onto the image array sensor 106 is greatly increased.

The lens 104 may be formed with a cyan filtered dye for transmitting light with wavelengths less than 600 nm. The lens 104 is used to focus the light rays onto the other half of the image array sensor 106. The cyan filter dye has a complementary effect to the red filter described above. In particular, the cyan filter dye transmits light from the blue end of the visible spectrum while absorbing light from the red end of the spectrum. As such, most of the light from sources, such as headlights, is transmitted through the lens 104 while virtually all of the light emanating from the tail lamps is blocked.

Both headlamps and tail lamps emit a substantial amount of infrared light. By utilizing lenses with a filter dye or separate filters which inhibit light at wavelengths greater than about 750 nm, the infrared light transmitted by the headlamps and tail lamps will be substantially blocked by the lenses 103 and 104. By eliminating infrared light, the ratio of intensity between red lights imaged through the red filter and red light imaged through the cyan filter will be substantially increased.

The use of the red and cyan dyes for the lenses 103 and 104 is merely exemplary. The filter characteristics of the lenses 103 and 104 are selected to optimize the sensitivity of the device to specific light sources. For example, the headlamps or tail lamps in new vehicles may be replaced with alternative light sources with different spectral composition, for example, with high intensity discharge headlamps and light emitting diode tail lamps requiring different filter characteristics. Depending on the spectral characteristics of the headlamnps and tail lamps, transparent lenses 103 and 104 may be utilized with separate color filters.

The lenses 103 and 104 may be formed as acrylic spherical lenses. Alternatively, the lenses 103 and 104 may be formed as aspherical lens in order to minimize color dispersion and spherical aberration present with spherical lens. Complex lenses formed from both spherical and aspherical lenses are also contemplated.

A single lens may also be used in place of the separate lenses 103 and 104. The use of a single lens may be used to image the field of view onto a full or partial color image array sensor containing pigmentation on the individual pixels in the array.

As shown best in FIGS. 2 and 3, the horizontal distance between the two lenses 103 and 104 and the image array sensor 106 is slightly different. Offsetting of the two lenses 103 and 104 compensates for the color dispersion created as a result of the fact that the index of refraction of materials varies with the wavelength of light transmitted through it. Because the two lenses 103 and 104 transmit different portions of the visible spectrum, the distance between the lenses 103 and 104 and the image array sensor 106 is optimized to minimize the dispersion for the band of light transmitted by each of the lenses 103 and 104.

As mentioned above, the light rays 101 transmitted through the lens 103 are imaged onto one-half of the image array sensor 106 while the light rays 102 transmitted through the lens 104 are imaged onto the other half of the image array sensor 106. In order to provide such spatial segregation of the light rays transmitted through the lenses 103 and 104, the lens holder 105 is provided with cutouts 107 and preferably formed or coated with a light absorbing material. These cutouts 107 prevent light rays beyond the desired maximum vertical angle transmitted through the red lens 103 from being imaged onto the portion of the image array sensor 106 reserved for the light rays 102. Conversely, the cutouts 107 also prevent light rays transmitted through the lens 104 from being imaged onto the portion of the image array sensor 106 reserved for the light rays 101.

The field of view of the optical system is defined by the configuration of the lenses 103 and 104 and the cutouts 107 relative to the image array sensor 106. For example, an exemplary field of view of 10 degrees in the vertical direction and 20 degrees in the horizontal direction may be created by the configuration set forth below. In particular, for such a field of view, the lenses 103 and 104 are selected with a diameter of 1.5 mm with a small portion cut away to allow the lenses 103, 104 to be positioned such that their centers are separated by 1.0 mm. The lens 103 is positioned 4.15 mm from the image array sensor 106 while the lens 104 is positioned 4.05 mm away. Both the front and rear surface radii of the lenses 103 and 104 are 4.3 mm with a 0.2 mm thickness.

As best shown in FIGS. 3 and 4, circular cutouts 108 are formed in the lens holder 105. A pair of generally rectangular apertures 110 is formed in a rear wall 112. The rear apertures 110 are 1.6 mm in the horizontal direction and 0.8 mm in the vertical direction. As best shown in FIG. 4, the cutouts 107 taper from the rear apertures 110 to the diameter of the front cutouts 108 to provide the field of view discussed above.

The configuration described above is thus able to baffle light outside of the desired horizontal and vertical field of view. In particular, FIG. 3 illustrates how the system baffles light rays incident at angles beyond the vertical field of view. FIG. 4 illustrates light rays being imaged onto the image array sensor 106 within the horizontal field of view.

The image array sensor 106 may be CMOS active pixel image sensor array, for example, as disclosed in U.S. Pat. No. 5,471,515, hereby incorporated by reference and available from Photobit LLC of La Crescenta, Calif. CMOS active pixel image sensors provide relatively high sensitivity and low power consumption as well as the ability to integrate other CMOS electronics on the same chip. The image array sensor 106 may be a 50×50 40 μm pixel array. The number of pixels in the image array sensor 106 is selected such that not all pixels fall within the area that the lenses 103 and 104 project onto. The extra pixels allow for simple correction for mechanical misalignment by offsetting the expected image location.

The image array sensor 106 provides spatial information regarding light sources within the field of view. The number of pixels present in the array is selected to obtain sufficient spatial detail although the size of the array is not limited and may be selected, and may even be dictated by physical and economic limitations. The image array sensor 106 must be sensitive to accurately detect tail lights at several hundred feet. Such sensitivity may be achieved by lengthening the amount of time the photosites in the array are exposed to light during a frame period. A frame period is selected to enable the array to capture and transfer a frame to the image processing system in a short enough time to allow the image processing system to detect another vehicle entering the field of view. A short time period also limits the amount of motion within a frame during the integration period and thus produces a relatively more accurate instantaneous image.

The use of a pixel array also provides other benefits. For example, as mentioned above, the light integration time to capture a frame can be varied. Such a feature allows the system to provide optimal results in varying degrees of darkness. Another important aspect of an image array sensor is the ability to utilize subsets of the pixels within the array or an individual pixel. As such, as the window size is decreased, the readout rates can be increased. Such a feature allows the system to discriminate ambient light sources, such as street lamps. In particular, such a feature allows the system to locate a light source within the frame and capture several samples of the light sources at a rate several times greater than 60 Hz. In particular, if the samples exhibit 120 Hz intensity modulation, the light source is likely a street lamp or other light source powered from a 60 Hz AC power supply. If the light source is not modulated, the light source is likely powered by the vehicle's DC power supply.

Another potential benefit of the image array sensor is that it allows the field of view immediately in front of the vehicle to be imaged by a higher pixel resolution. Thus, the system may be configured such that the effective pixel resolution decreases as the angle of the vehicle relative to the controlled vehicle increases thus reducing the amount of processing time in those areas. Such a configuration reduces the sensitivity of the device to light sources from reflective stationary objects on the side of the road.

An image array sensor could be manufactured in which the pixel pitch is varied as a function of the area in the field of view that the pixel images. For example, pixels imaging the space corresponding to horizontal angles within 3° of the center of the vehicle may be provided with a 10 μm pixel pitch. Pixels imaging horizontal angles between 3° and 6° may be provided with a 20 μm pixel pitch, while those imaging angles greater than 60° may be provided with a 40 μm pitch. While such a configuration may not increase the sensing area, the ability to resolve detail increases; an important aspect in considering the relative size of a tail lamp at a relatively large distance. For example, a 4½ inch diameter tail light at a distance of 200 feet subtends an angle of less than 0.11°. If a 50×50 image array sensor is used to image a 20° field of view, the tail lamp would subtend approximately 5.7 percent of the total area imaged by the pixel.

A tail lamp is relatively brighter than its ambient surroundings, however, the red light contributed by the tail light is diluted by the ambient light at such a distance. Such a factor is critical when comparing the amount of red light in a given area to the amount of non-red light in the same area. When the area of space compared is large relative to the light source, the percentage of red light is diminished. By comparison, if 10 μm pixels are used in the center of the array 106 instead of 40 μm pixels, the tail lamp would subtend 90 percent of the total areas, an improvement of 16 times.

Image Processing System

The image processing is illustrated in FIGS. 5-8. The image processing system includes the image array sensor 106; a microprocessor 204, for example, a Motorola type HC08; a headlamp control unit 205; and a pair of headlamps 206. As mentioned above, an active pixel array sensor may be utilized for the image array sensor 106. Such an active pixel array sensor includes an image array 201 and an analog to digital converter (ADC) 202. A timing and control circuit 203 is used to control the image array 201 as well as the ADC 202 to control the integration time, read-out timing, pixel selection, gain offset and other variables. The microprocessor 204 is used to analyze the data collected by the image array sensor 201. The microprocessor 204 is in communication with the headlamp control unit, a conventional unit, implemented, for example, as a relay, which, in turn, controls the headlamps 206. The headlamp control unit 205, in turn, changes the voltage applied to the headlamp 206 to cause the high beam or bright lamp to be switched on or off.

The flow chart for the headlamp control is illustrated in FIG. 6. The system runs in a continuous cycle with occasional interrupts for absolute light measurements, adjustments of ADC parameters, or other functions.

At the beginning of each cycle, two images are acquired through the lenses 103 and 104, as in block 301. In step 302, the images from the lenses 103 and 104 are analyzed to detect tail lamps. Another image is acquired in step 303 through the lens 104. The image acquired through the lens 104 is acquired with a low enough gain to detect oncoming headlights while rejecting lower light level reflections and nuisance light sources. After the images are analyzed, the system checks for very bright lights in the image indicating the sudden appearance of vehicle headlamps or tail lamps within the field of view, as in the case, when a car turns in front of the controlled vehicle in step 305. If bright lights are sensed, the device dims the headlamps 206 immediately and bypasses the time verification as discussed below. The cycle is then repeated. If there were no bright lights, the system proceeds to step 307 to determine if there are any headlamps or tail lamps in the image.

In order to confirm the presence or lack of a headlamp or tail lamp in a frame, an undim counter and a dim counter are used. These counters provide verification of a particular light source whether from a tail lamp or headlamp from consecutive frames before signaling the headlamp control unit 205 to dim or undim the headlamps 206, except as described above when a bright light is detected. By providing verification, anomalies within the device or in the image will not cause spurious operation of the headlamps 206.

The dim counter is incremented each time a frame with a headlamp or tail lamp is detected until the number of required consecutive frames to take action is reached. The dim counter is set to 0 each time a clear frame is processed. The undim counter is incremented with each clear frame and set to 0 with each frame containing a headlamp or tail lamp. The actual number of consecutive frames required to dim or undim is determined by the overall speed of the device. The more frames used for verification, the less susceptible the system will be to noise and anomalies. However, the device must be able to react quickly to be effective so the number of verification frames is kept relatively low. Whenever a headlamp or tail lamp is detected in step 307, the undim counter is set to 0 in step 308. In step 309, the system checks whether the headlamp 206 high beams are on. If the high beams are off, no further action is required and the cycle is repeated as indicated by step 317. If the high beams are on, the dim counter is incremented in step 310. After the dim counter is incremented in step 310, the system checks in step 311 to determine if the dim counter has reached the number of consecutive frames required to dim the headlamps 206. If so, the system proceeds to step 306 and dims the headlamps 206 and resets both the dim and undim counters and repeats the cycle. Otherwise, the system repeats the cycle and proceeds to step 317.

In step 307, if there are no headlamps or tail lamps in the image, the dim counter is set to 0 in step 312. Subsequently, in step 313, the system determines whether the high beams 206 are on. If the high beams are on, the system repeats the cycle in step 317. In step 314, if the bright lights are not on, the undim counter is incremented. After the undim counter is incremented, the system checks in step 315 whether the undim counter has reached the number of consecutive clear frames required to activate the high beams 206. If so, the high beams are turned on in step 316, and the cycle is repeated. If the undim counter is less than the required number for activating the bright headlamps 206, the system repeats the cycle in step 317.

Figure 7:
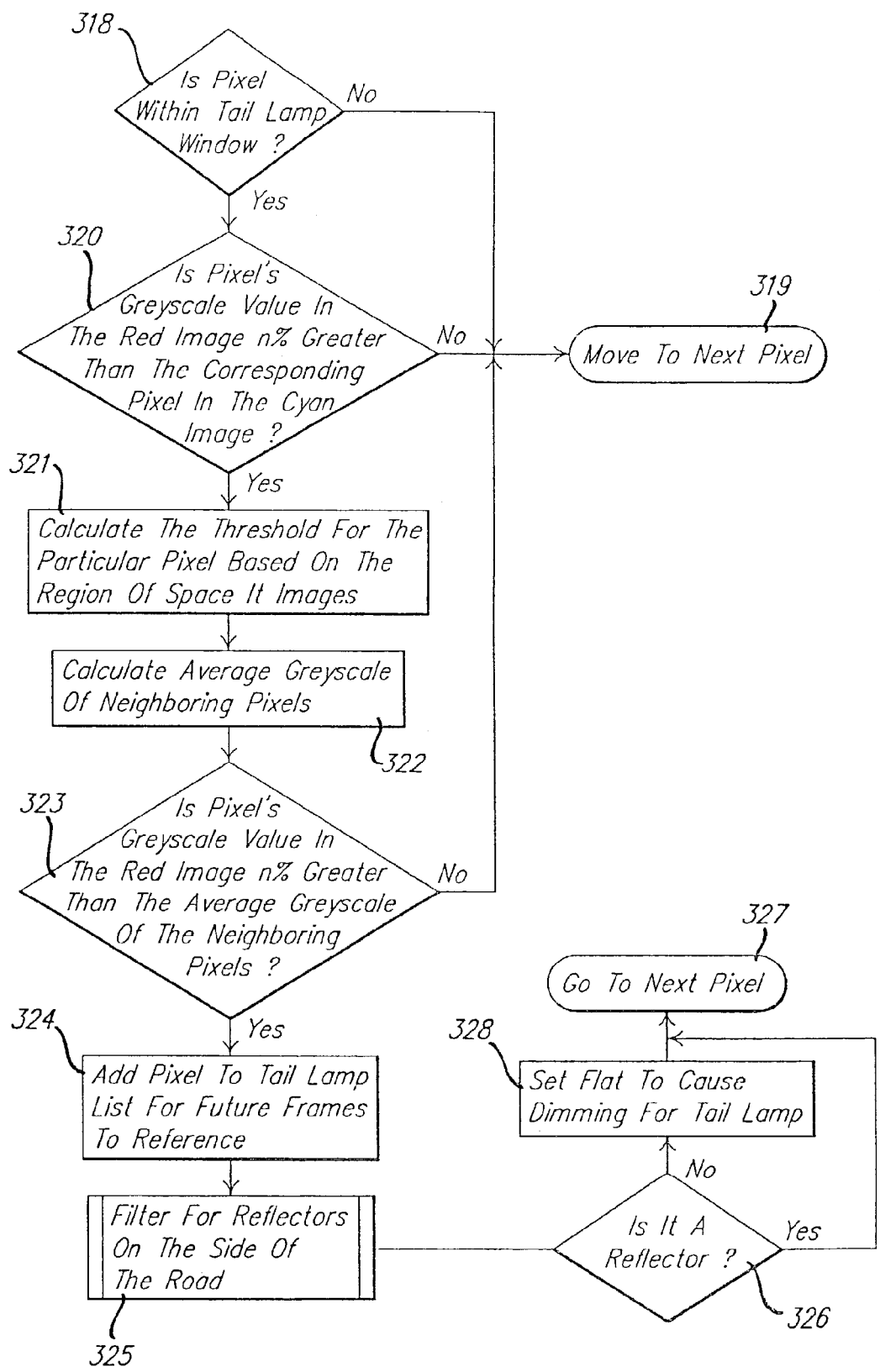
FIG. 7 is a flow diagram illustrating the method for detecting tail lamps of vehicles within the desired field of view.

The flow diagram for tail light processing is illustrated in FIG. 7. As will be discussed in more detail below, the primary method of identifying an object such as a tail light involves comparing the gray scale value of a pixel through the lens 103 to a gray scale value of the pixel representing the same space imaged through the lens 104. If the value of the pixel imaged through the lens 103 is significantly higher than the value of the pixel imaged through the lens 104, the light source is determined to be red light. In addition to determining if the light is red, the system also checks the brightness of the red light before deciding that the light is a tail lamp by determining if the gray scale value of the pixel is greater than a threshold value. As is known in the art, the brightness of a light source varies with the square of the distance of the light source from the observer. As such, an approximate determination of the distance of a leading vehicle can be made to determine the appropriate time to dim the headlamps.

The threshold value may be computed in a variety of ways. For example, it can be a predetermined fixed number or a number that is a function of the current image sensor and ADC settings. The threshold value can also be determined by computing a threshold as a factor of the average pixel intensity of the entire image which would help eliminate variances caused by changing ambient light sources. In addition, the pixel value may be compared to the average of the pixels in the immediate area of the pixel of interest. This local average method prevents relatively large, moderately bright spots in the image from being seen as vehicle light sources. More particularly, distant tail lamps subtend less than one pixel and thus will only have moderate brightness. Large spots in the image with moderate brightness are most likely caused by reflections from large objects. Close tail lamps which subtend many pixels will have a saturated center which will be brighter than the surrounding pixels allowing the same method to detect them as well.

The threshold may also be determined by varying the threshold spatially by way of a look up table or computation. However, the threshold should be determined so that dimming occurs appropriately for the dimmest tail lights allowed by the DOT standards. Distant vehicles are subjected to the most intense portion of the controlled vehicle high beam, thus requiring dimming only directly in front of the controlled vehicle as indicated in FIG. 1. Thus, a relatively low threshold may be selected for light sources imaged directly in front of the controlled vehicle while a higher threshold may be selected for light sources that are not directly in front of the controlled vehicle. For example, as discussed in connection with FIG. 1, the threshold for pixels imaging the field of view 3° right and left of the center should correspond to a light level incident on the image array sensor 106 about 4 times as bright as the threshold for red light directly in front of the vehicle and 12 times as bright for vehicles at 6°. Such a spatially varying threshold helps eliminate false tail lamp detection caused by red reflectors by making the system less sensitive to areas to the sides of the controlled vehicle.

A similar approach can be taken for varying the threshold for pixels in imaging areas of space and angles above and below the center. However, a more conservative approach can be taken when determining the tail light sensitivity relative to the vertical angle since vehicles tend to move more frequently and rapidly in vertical directions due to hills and bumps in the road. Therefore, specifying relatively tight vertical thresholds may cause the bright headlamps 206 to switch on and off as the vehicle moves several degrees up and down.

A hysteresis multiplier may be applied to the threshold to prevent oscillations of the headlamps 206 when the light source has a gray scale value at or near the threshold. Thus, if the bright headlamps 206 are off, the threshold will be lower for all pixels to prevent the bright headlamps from coming back on even if the faintest tail lamps are present in the image. However, if the bright headlamps 206 are on, the threshold should be higher so that only tail lamps of sufficient brightness are sensed to indicate that the car is within the dimming range to cause the headlamps 206 to dim.

One of the biggest problems facing the detection of the tail lamps is the nuisance red light reflected from corner cube reflectors commonly found as markers on the side of the road and on mail boxes. The variable threshold method mentioned above helps eliminate some of this noise. However, when a vehicle approaches a reflector at the proper angles, it is relatively impossible to distinguish a red reflector from a tail lamp. Fortunately, by examining successive frames and investigating the motion of these objects over time, such reflections can be filtered. By storing the location of the tail lamps and images over time or by sensing a small region of interest where the tail lamp is located, several consecutive times, the device can look for rightward motion and determine if the light source is a reflector. Additionally, the speed at which the control vehicle overtakes a stationary object is much greater than the relative rate a vehicle would overtake another moving vehicle. Thus, the rate of increase in brightness of the object would be typically much greater for a stationary reflector than for another vehicle. This rate of change in brightness coupled with rightward horizontal motion can be used as signatures to reduce the number of false tail lamps detected.

A computationally simpler method of analyzing spatial motion of a light source is to take several consecutive regions of the local region of interest where the light source is located. Motion in the vertical and horizontal directions is relatively slow for tail lamps of a leading vehicle. Sampling a pixel a few consecutive times to see if the tail lamp is present in all samples can adequately eliminate objects which rapidly move within the image.

The flow diagram for tail lamp processing is illustrated in FIG. 7. Initially, in step 318, the system ascertains if the pixel is within the tail lamp window. In particular, as mentioned above, red lights are imaged onto half of the image array sensor 106. Thus, if the pixel is not within the appropriate half of the image array sensor 106, the system proceeds to step 319 and moves to another pixel. As mentioned above, there are two criterions for ascertaining whether the image is a tail lamp. The first criterion relates to comparing the gray scale value of the pixel image through the lens 103 with a corresponding gray scale value for the same area in space imaged through the lens 104. If the gray scale value of the pixel imaged through the lens 103 is significantly larger than the gray scale value of the corresponding pixel imaged through the lens 104, one of the criterion for detecting a tail lamp is met. Thus, if the pixel of interest is within the lamp window as ascertained in step 318, the gray scale value of the pixel imaged through the lens 103 is compared with the gray scale value of a corresponding pixel imaged through the lens 104 in step 320. If the gray scale value of the pixel image through the lens 103 is not n % greater than the corresponding pixel imaged by the lens 104, the system proceeds to step 319 and examines another pixel. Otherwise, the system proceeds to step 321 and calculates the threshold for the particular pixel based on the region of space it images. For example, as discussed above, the pixel thresholds may be varied based on their spatial relationship within the image array sensor.

As discussed above, the other criteria for tail lamp detection relates to the brightness of the pixel relative to the neighbor pixels. Thus, in step 322, the system calculates the average gray scale value of neighboring pixels. If it is determined in step 323 that the pixel gray scale value for the pixel imaged through the lens 103 is n % greater than the average gray scale value of the neighboring pixels, the system proceeds to step 324 and adds the pixel to the tail lamp list for future frames of reference. Otherwise, the system moves to step 319 and moves the next pixel. In steps 325 and 326, the system determines whether or not the red light detected is a tail lamp or a reflector, as discussed above. If it is determined that the light is a reflector, the system proceeds to step 327 and moves on to the next pixel. Otherwise, the headlamps are dimmed in step 328.

Figure 8:
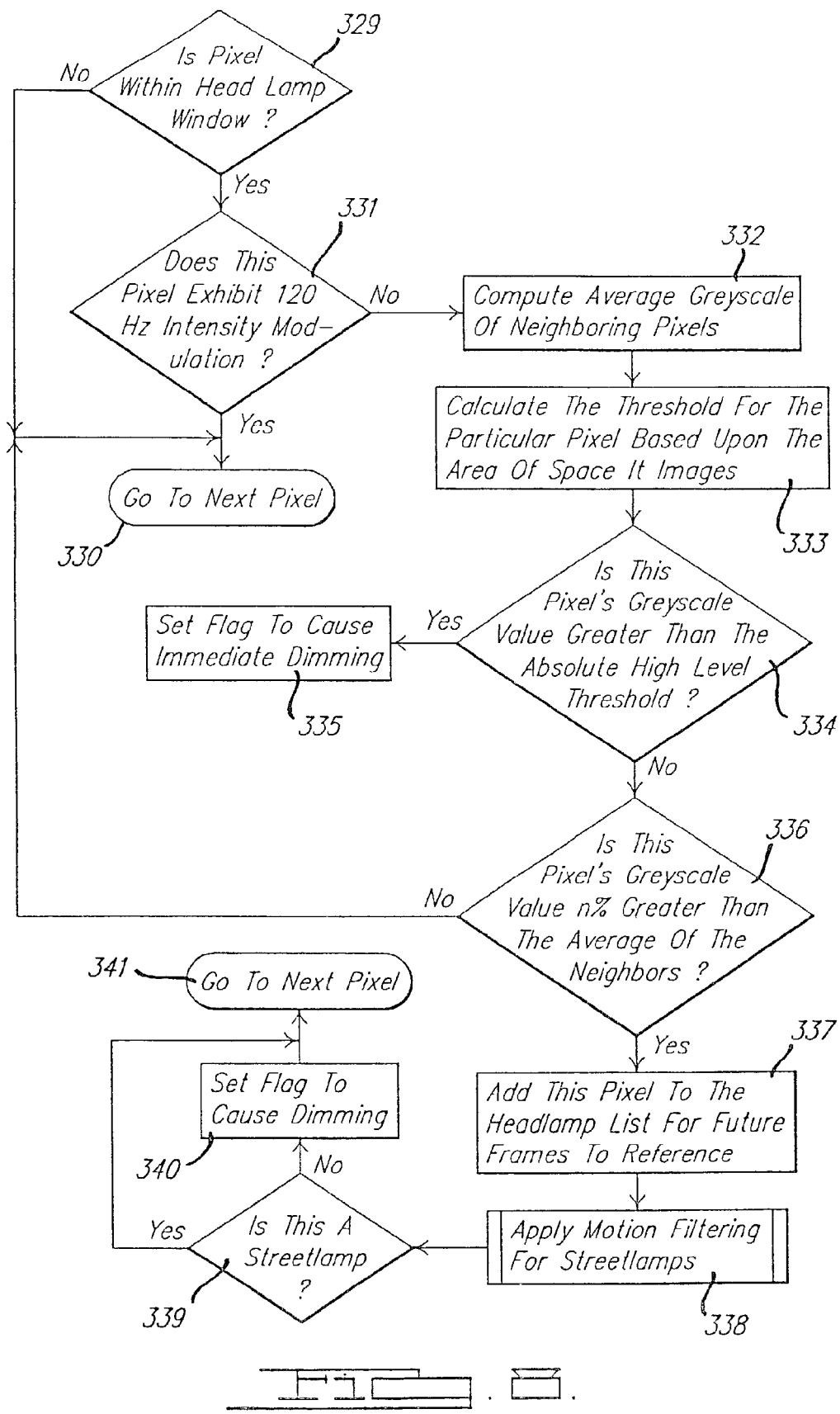
FIG. 8 is a flow diagram for detecting headlamps from other vehicles within the desired field of view.

The flow diagram for headlight processing is illustrated in FIG. 8. Headlamp detection is similar to tail lamp detection. The primary difference is that only the image seen through the lens 104 is utilized. As mentioned above, the pixel integration time is shorter and the ADC parameters are such that the image only shows very bright objects, such as headlamps. Most reflections have low intensity light sources that fall well below the zero threshold of the ADC. As such, pixels are compared to the local average intensity of the neighboring pixels. Spatial variances in the thresholds may be set so that pixels corresponding to the center of the field of view are more sensitive than pixels on the left of the image (left-hand drive countries). These thresholds, however, should not vary spatially to the same degree as the threshold for the tail lamps because of the relatively wide variance in the emission patterns observed from headlamps. In addition, due to the relatively higher potential for more glare to the driver of an oncoming car, the headlamps may be controlled and dimmed relatively more rapidly than in the case when a tail lamp from a vehicle traveling in the same direction is detected. Similar to the tail lamp processing circuit, hysteresis may be added to prevent cycling of the headlamps.

An additional concern with headlamp detection arises from the rapid decrease in distance between oncoming vehicles which becomes especially critical when an oncoming vehicle suddenly enters the controlled vehicle's field of view, for example, when turning a corner or in a similar situation. For this reason, an additional flag is used to cause the vehicle to immediately dim the bright headlamps and bypass any verification if the light source is above a certain absolute high level brightness threshold.

The primary nuisance light source complicating headlamp detection comes from over headlights, such as street lights and electrically illuminated street signs. One method of eliminating such nuisance light sources is to analyze their motion. In particular, all overhead street lamps will move vertically upwards in the image as the controlled vehicle is moving. Analyzing this motion provides an efficient method of detecting some street lamps. Unfortunately, distant street lamps appear to be at almost the same elevational angles as distant headlights and the rate of vertical climb in the image does not become great until the street lamp is closer. However, as discussed above, street lighting is AC controlled and thus is subject to 120 Hz intensity modulation. Headlamps powered by DC source do not exhibit this characteristic. Thus, the image array sensor 106 is able to utilize a small number of pixels that take several rapid consecutive readings in a window. If the window is small enough, the window can read several hundred frames per second. Once the light source is identified in the image, several frames are read out at a rate of 240 Hz or higher. These readings are then analyzed to detect the intensity modulation. If modulation is present, the light source originates from an AC source and can be ignored. Alternatively, a photodiode can be used in conjunction with a low pass filter to determine the ratio of light in the image that was AC modulated to the unmodulated light. If a significant portion of the light source is AC modulated, the light source present in the image is assumed to be from AC light. Otherwise, the light source is assumed to be from a DC source.

The flow diagram for headlamp processing is illustrated in FIG. 8. Initially, the system determines in step 329 whether the pixel is in the headlamp window (i.e., that portion of the image array sensor 106 reserved for light arrays imaged through the lens 104). If not, the system proceeds to step 330 and examines the next pixel. Otherwise, the system examines the pixel in step 331 to determine if the pixel is modulated at 120 Hz as discussed above. If so, the light source is assumed to be a street lamp and thus, the system proceeds to the next pixel in step 330. If the pixel is not subject to 120 Hz intensity modulation, the system then computes the average gray scale of neighboring pixels in step 332. In step 333, the system determines the threshold for the particular pixel based on the area of the space it images. The system next compares the gray scale value of the pixel with an absolute high level threshold in step 334, for example, to determine if any oncoming cars suddenly come into the field of view of the controlled vehicle. If so, the system proceeds to step 335 and sets a flag to cause immediate dimming. Otherwise, the system proceeds to step 336 and determines if the gray scale value of the pixel is n % greater than the average of neighboring pixels. If not, the system returns to step 330 and examines the next pixel. Otherwise, the system proceeds to step 337 and adds the pixel to the headlamp list for future frames to reference.

The system examines light sources as discussed above in steps 338 and 339 to determine if the light source is a street lamp. If the system determines that the light source is not a street lamp, the system proceeds to step 340 and sets a flag to cause dimming of the headlamps 206. If the system determines that the light source is a street lamp, the system proceeds to step 341 and moves on to the next pixel. Traditional vehicle lamp systems have the option of the bright lamps being either on or off. The present invention is readily adaptable for use with a headlamp system where the bright lamps can be activated to vary the brightness based on the distance of other vehicles in the field of view. In such an embodiment, the brightness of the headlamps may be varied by various techniques including modulating the duty cycle of the headlamp in order to reduce or increase the overall brightness level.

Variable intensity headlamps also result in better noise filtration. In particular, whenever a light source is detected which causes the brightness of the controlled headlamps of the vehicle to be decreased, other images can be detected to determine if the intensity of these other light sources decreases by a similar amount. If so, the system would be able to determine that the light source is a reflection from the vehicle's headlamps. Such information can be used as feedback to provide a relatively efficient means for eliminating nuisance light caused by reflections of the controlled vehicle's headlamps. In such an embodiment, the brightness threshold discussed above would not be used. More particularly, the brightness of the brightest headlamp and tail lamp in the images is used to determine the brightness of the controlled vehicle's headlamps. The brighter the headlamps or tail lamp in the images, the dimmer the controlled headlamps.

Image Array Sensor Control System

The control system in accordance with the present invention is adapted to economically perform the flexible windowing function for the exemplary application discussed above. There are three important considerations in the exemplary application discussed above, for example. First, there is great utility in being able to control window size and orientation as well as the modes of operation of the image array sensor; for example, in the application discussed above, the ability to switch between dual and single window modes of operation. Second, other parameters, such as the sensitivity, the frame read repetition timing, and the number of frames to read all need to be controlled. Third, in the exemplary application discussed above, practically every new reading requires a major change in setting from the previous reading so it must be possible to rapidly change the settings. Even though in such an application, there is a need for frequent and numerous changes in operational settings, little overhead is added by requiring all of the settings to be written before each reading. This also eliminates the need for time-consuming address transmissions and for the extra complexity of a bus structure and address decoding in the image array control circuit.

There are many other considerations for a control system for an application as discussed above. First, in order to minimize cost and to provide a compact control circuit, it is desirable to be able to integrate several, if not all, of the major components of the circuit into a single integrated circuit. In accordance with one aspect of the present invention, the control circuit, as discussed below, includes a serial interface to a microcontroller which can be integrated on the same integrated circuit as the image array sensor and can also be integrated with various other components, such as an analog to digital converter for digitizing the pixel readings. Ultimately, even the microcontroller may be integrated on the same integrated circuit chip.

Another consideration for such a control circuit is that the optical window required for the imaging array sensor increases the package cost, and electrical connections are also more expensive to provide in the package with the optical window than with conventional integrated circuit packages. For these reasons, it is highly desirable to use a low pin count serial interface between the imaging chip and the microcontroller. It is an advantage to use the same bi-directional serial interface to issue instructions to the image sensor controller and to read the digitized image information which is returned. It is a further advantage to maintain a common serial path, serial registers and timing for interfacing with the serial port to the microcontroller, continuing to utilize the common serial architecture and registers for queuing the instructions, and finally for processing the instruction data to perform the required imaging operation. It is further advantageous to couple the steps in the successive approximation of the pixel reading to the same clock that is used for the above serial instruction processing and to synchronously transmit the successive bits of the conversion back to the microcontroller, this bit-wise transmission commencing while the successive approximation steps for conversion of that same pixel are still in progress. Since a production imaging controller will need custom circuits and design to apply state-of-the-art technology, the cost of the silicon area will also be relatively high, at least initially. Thus, it is important for the logic which couples the imaging array to the microcontroller and which controls the image sensing process to be implemented with a modest silicon area. To meet these and other design objectives, a novel serial architecture is utilized to interface directly with a microcontroller to efficiently register the frequently changed instructions and to perform the processing to control the rather complicated windowed readout function.

In an exemplary application, 9 bytes (72 bits) of instruction data are shifted into 9-byte long shift register segments, which are configured as one serially contiguous register during the serial load operation. Several 8-bit long registers, each of which must be initialized to a respective value equal to or determined by one of the values in the main chain, are configured as branches off of the 72-bit chain. In one configuration of the invention, the byte wise serial order is changed from most significant bit first to least significant bit first in the first of the 8-bit shift register segments. This is done because the microcontroller used transmits and receives the most significant bit first and the successive approximation analog to digital converter converts and transmits the most significant bit first. The serial incrementing circuits, on the other hand, must have the least significant bit transmitted first. In two other 9-bit shift register segments, the value is pre-incremented as it is shifted in. Thus, in the more general case, the simple shift register function is augmented with an additional processing step so that the specific register segment is loaded with a processed derivative of the serial input value. In an embodiment of the invention, the timing for the analog to digital conversion process is common with the timing for the serial processing. A capacitor charge balance analog to digital converter may be synchronized to and in fact operated by the same clock which is used for the serial processing in the controller and the bits are transmitted over the common serial interface to the microcontroller as each successive approximation step of the conversion is made. This saves any extra synchronization, control, and buffering logic that may be required when the two functions are not synchronized to operate together.

The data which is serially loaded as described above preferably includes the following information. The numbers of the first and last columns of the first frame window are included. Bits indicating the separate options to inhibit reset of rows at the beginning of the integration period, to inhibit readout of the frames at the end of the integration period, and to select and process only the second frame are included. The last of these options is used when the dual window per frame feature as discussed above for processing headlamps and tail lamp images is not required. The numbers of the first and last rows of the first frame window are included. The row position indicative of the cyclic row offset between the row of the frame window which is reset at the beginning of the integration period and the row of the frame window which is read are also included in the serial data. The row and column offsets of the second frame relative to the first are also included for use when the second frame is selected. Provision is made to further increase the integration period beyond that provided by the cyclic row offset by inserting an integral number of zero or more additional integration frame periods (0 to 255, for example) between the reset of a particular row in the frame or pair of frames and the reading of the particular row. The data also includes the number of times to read the frame or frame pairs to complete the instruction.

The features to selectively inhibit the reset at the beginning of the integration period or the readout are included so that reset before integration and readout after integration can be handled as separate operations. The block size required for readout of the whole image at one time may exceed the microcontroller memory capacity. The readout operation resets only the rows which are read. For low light levels, it is necessary to use relatively long integration periods. The limited microcontroller memory may require the image to be broken into blocks so that the processing of each does not require more memory than is available. Without separate reset and read instructions, this would require very elaborate control or make it necessary to wait for the entire integration period to process each block. Efficient use of the sensor in low light conditions calls for collecting light over as much of the sensor area as possible as much of the time as is possible. Since for long integration periods the timing is not ordinarily as critical, the integration can be placed under the control of the microcontroller if the available control modes permit. This capability is provided for this reason. Furthermore, since windows of non-overlapping rows do not reset rows outside of their range during either reset at the beginning of the integration period or reset as part of the readout function, the field may be broken into windows with non-overlapping rows which are reset on a staggered schedule using separate instructions which inhibit the readout function but enable the reset function. The microcontroller may then initiate successive readout and processing of these blocks each after an acceptable integration period by inhibiting the reset function and enabling the readout function. Either the dual or single frame modes may be selected. In this way, the integration period for processing of multiple blocks may be overlapped with a minimal increase in the complexity of the controller circuit. In the above sequence, the integration period for each instruction is normally set to a minimum value since the actual integration period is determined by the microcontroller and a single readout cycle of the single or dual frames is normally selected.

The embodiment illustrated is configured to interface with and control an array of photodiode pixel sensors, for example, as discussed above. In general, the charge at each of the photosites in a row is drained off when the row is reset. Charge is then accumulated when electrons are freed as photons strike the photosite so that for a relatively wide range of light levels and integrating times, the accumulated charge is approximately proportional to the product of the integrating time and the light level. Thus, the integration period as described above is analogous to the exposure time with a camera and film.

In one embodiment, a successive approximation analog to digital converter is utilized and to minimize the buffer memory and control logic, the bits are shifted back to the microcontroller as the successive approximations are made with minimal buffering provided to optimize clock timing on the serial bus to the microcontroller.

Following the receipt of the read instruction data, the control system responds preferably on the same serial interface with the serially transmitted digitized readings which indicate the light level received by each of the pixels in each of the frames specified by the instruction. This reading sequence is repeated the number of times specified in the instruction. The microcontroller, for example, a Motorola 68HC708XL36, utilizes a direct memory access function which may be utilized to increase rates at which data can be transferred to the microcontroller from the photo sensor and to free the microcontroller for other functions. One drawback is that the direct memory access function of the particular microcontroller is limited to blocks of 256 bytes at a time. Each pixel reading is encoded as an 8-bit value so the 256 bytes can store readings from only 256 pixels. With a nominal 64×64 pixel array for the dual frame sensor for the rain or headlamp dimmer sensors, if, for example, 60 bits corresponds to 30°, then a 10° by 30° field will contain 1200 pixels, and the corresponding two color dual frame will contain 2400 pixels. This field may have to be read and processed in blocks to prevent overrunning the available memory in the microcontroller and before the memory limit is reached. To use the direct memory access feature of the selected microcontroller, the data will need to be collected in blocks of 256 bytes or less. In one embodiment, there is an interval equal to the time required to transmit 5 successive pixels in a row at the beginning of each new row. To utilize the direct memory access feature when more than one block of data must be collected for a particular read instruction, the block length is preferably set so that blocks end on row boundaries and an interrupt mode is selected so that the microcontroller is interrupted at the end of each block which is received. The microcontroller then has the five pixel interval to set the direct memory controller to receive the next block of data. This between row delay time is used by the control circuit to issue the reset to the row to start its integration period and to transfer the charge from pixels in the row to capacitors for readout. This process is detailed in the circuit description which follows. The five pixel delay period between rows may optionally be made variable or changed to some other fixed delay period. However, the between row delay period for a given read operation is preferably made a consistent length even though not every function performed during this period is performed every time. The benefit of the consistent time period is that the control logic is less complicated as is the computation of the frame reading interval. Also, a variable period, depending on the pattern of the variation, could make repeated frame readings non-periodic which would create problems in the harmonic analysis. The microcontroller used may optionally be replaced by a digital signal processor or other programmable data processing device.

Figure 9:
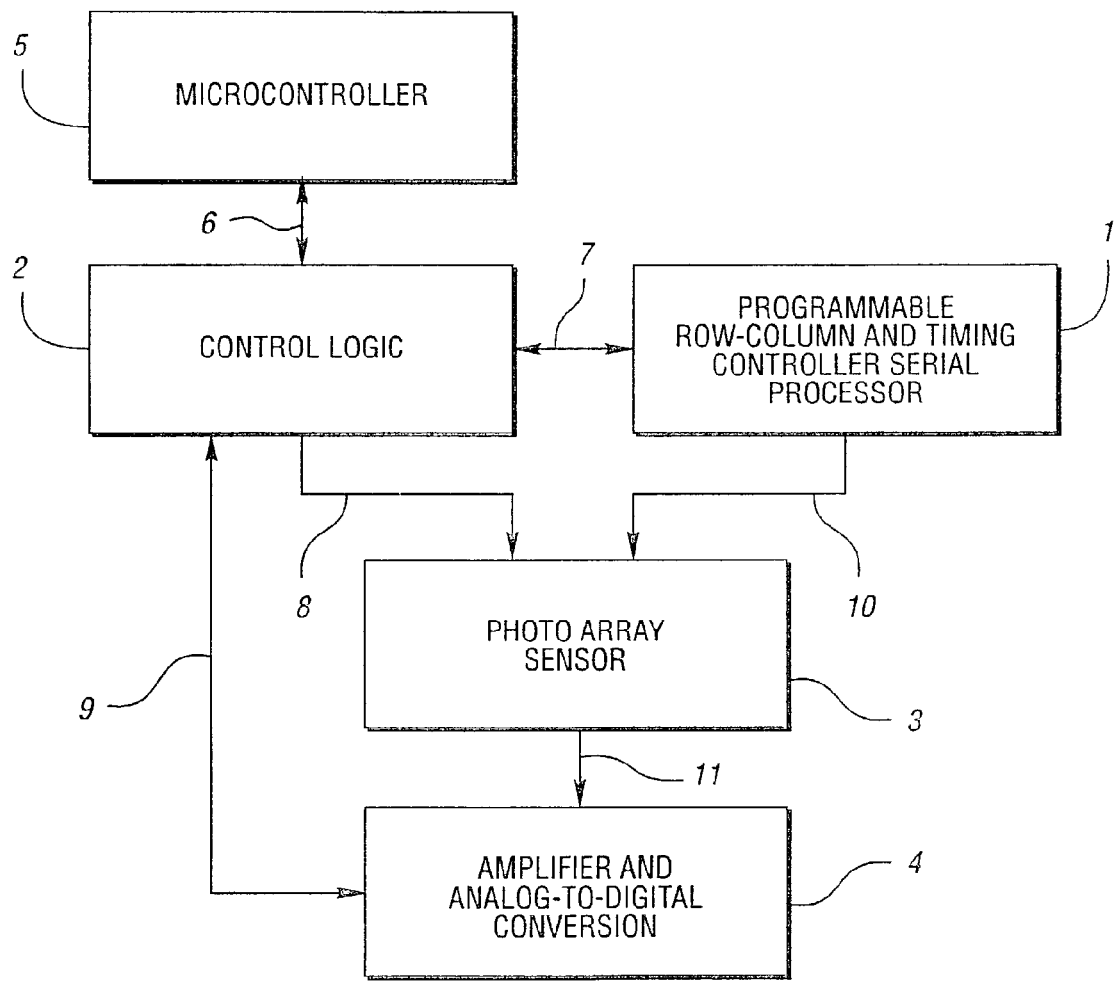
FIG. 9 is a block diagram illustrating an exemplary application of the control circuit in accordance with the present invention.

Referring to FIG. 9, a block diagram of an exemplary control system which incorporates an image array sensor and microcontroller for use with the present invention is illustrated. The system includes a programmable row-column and timing controller 1, control logic 2, an image array sensor 3, an amplifier and analog to digital converter (A/D) circuit 4 and a microcontroller 5. The present invention relates to the control logic 2 and programmable row-column and timing control circuit 1 for controlling the image array sensor 3 and providing a bi-directional serial communication interface with the microcontroller 5. As will be appreciated by those of ordinary skill in the art, the programmable row-column and timing control circuit 1 as well as the control logic circuit 2 which form the present invention may be implemented as an ASIC and integrated with one or more of the following portions of the overall circuit: microcontroller 5; image array sensor 3; and amplifier and A/D converter circuit 4.

Figure 10A:
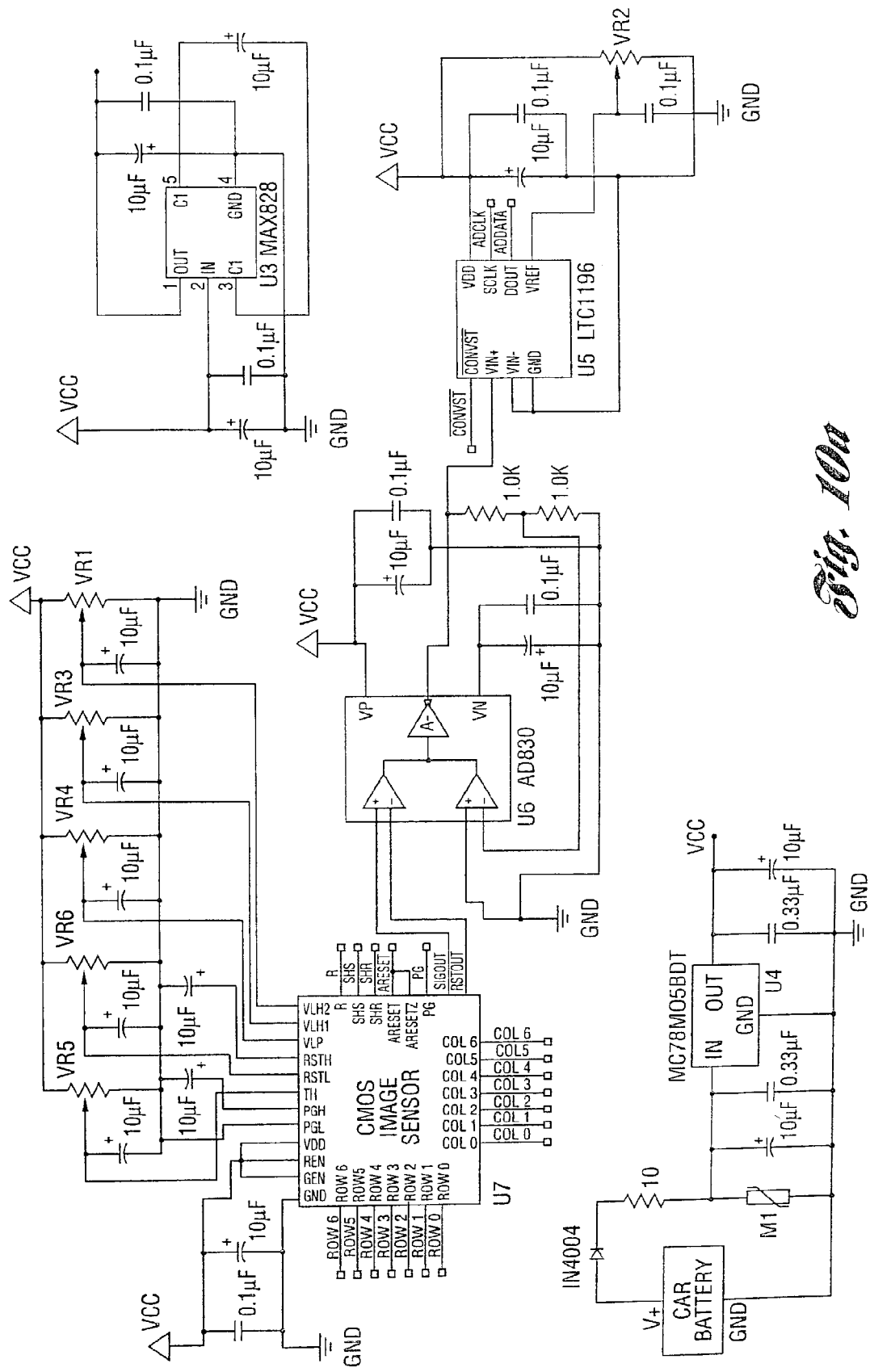
Figure 10A:
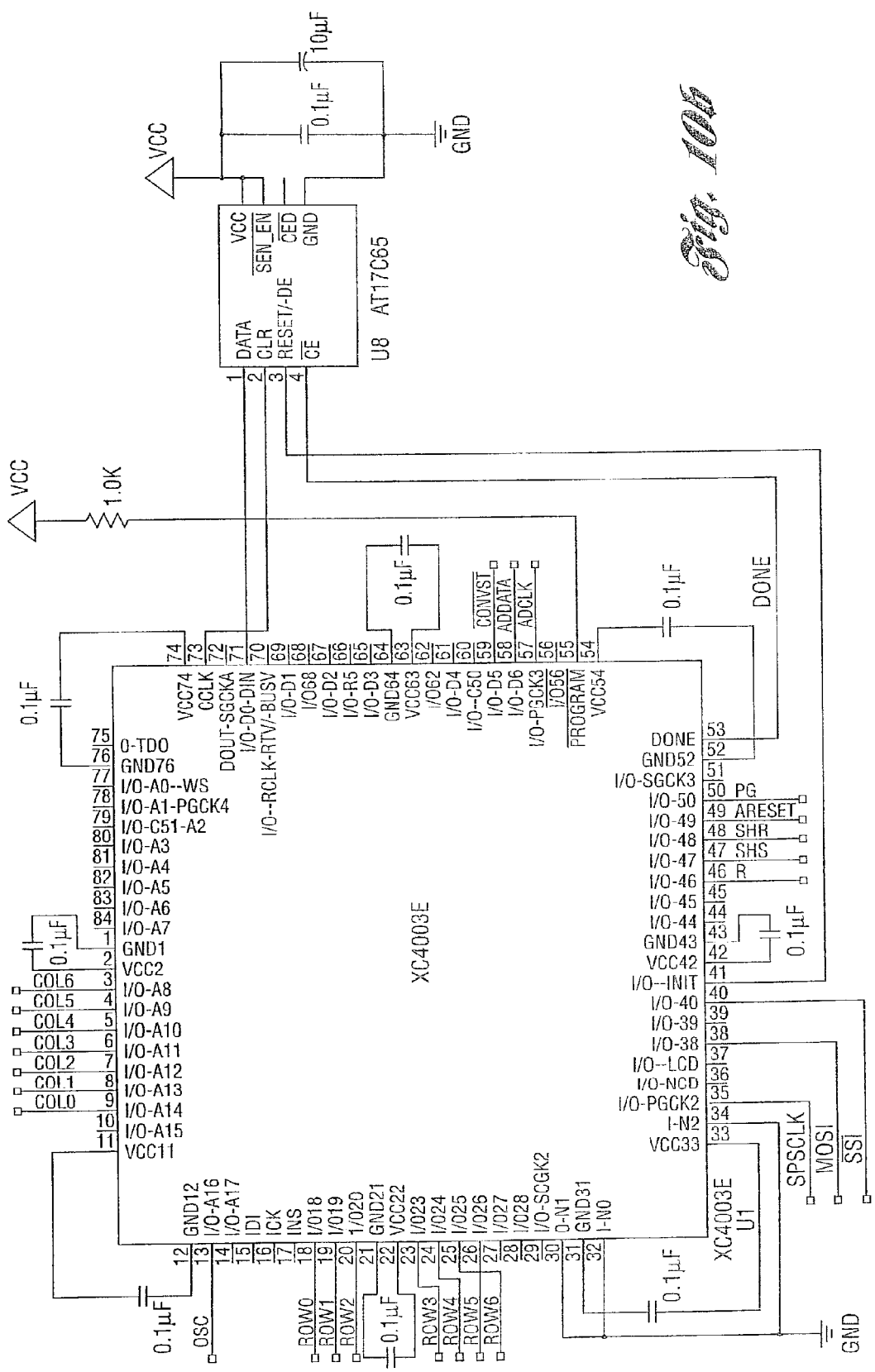
Figure 10C:
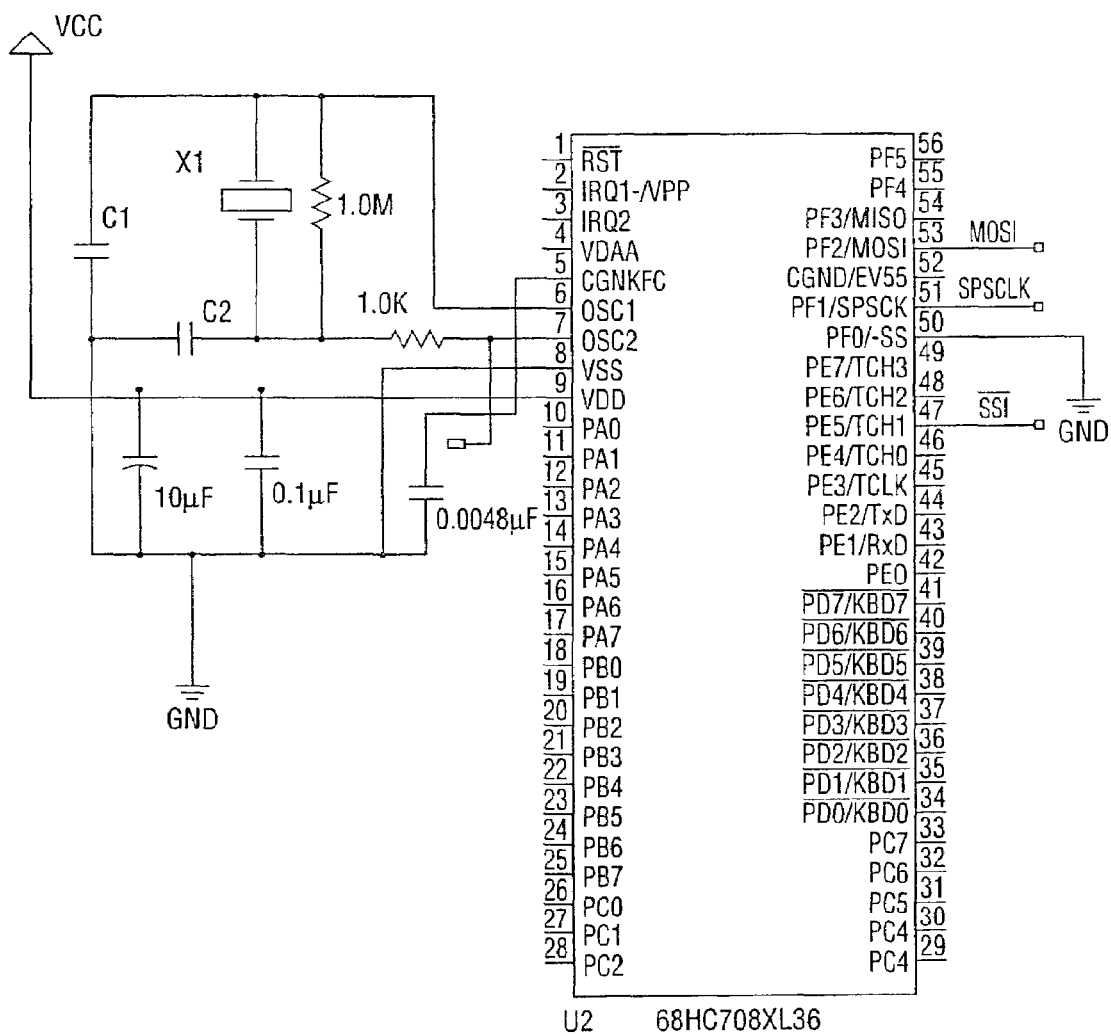

FIGS. 10a-10c are schematic diagrams of the block diagram illustrated in FIG. 9. As shown in FIG. 10b, the control circuit in accordance with the present invention, which, as mentioned above, incorporates the control logic 2 and programmable row-column and timing controller 1, is shown implemented, for example, as an ASIC XC4003E.

FIG. 12 is the top level schematic diagram used to generate the program for the ASIC XC4003E as shown in FIG. 10b. FIGS. 12a and 12b along with the referenced lower level diagrams are implemented using Workview Office™, Version 7.31, Feb. 6, 1997, Viewlogic Systems, Inc. in combination with the Unified Library from Xilinx, Inc. These schematics are used to generate a net list which may be processed by the Xilinx Design Manager version M1.3.7. The bit stream generated by the component programs of the Xilinx Design Manager may be used to program the ASIC XC4003E. The Atmel AT17C65 serial memory in FIG. 10b is configured to store and automatically download the program to the XC4003E each time that power is first applied to the circuit.

Figure 11A:
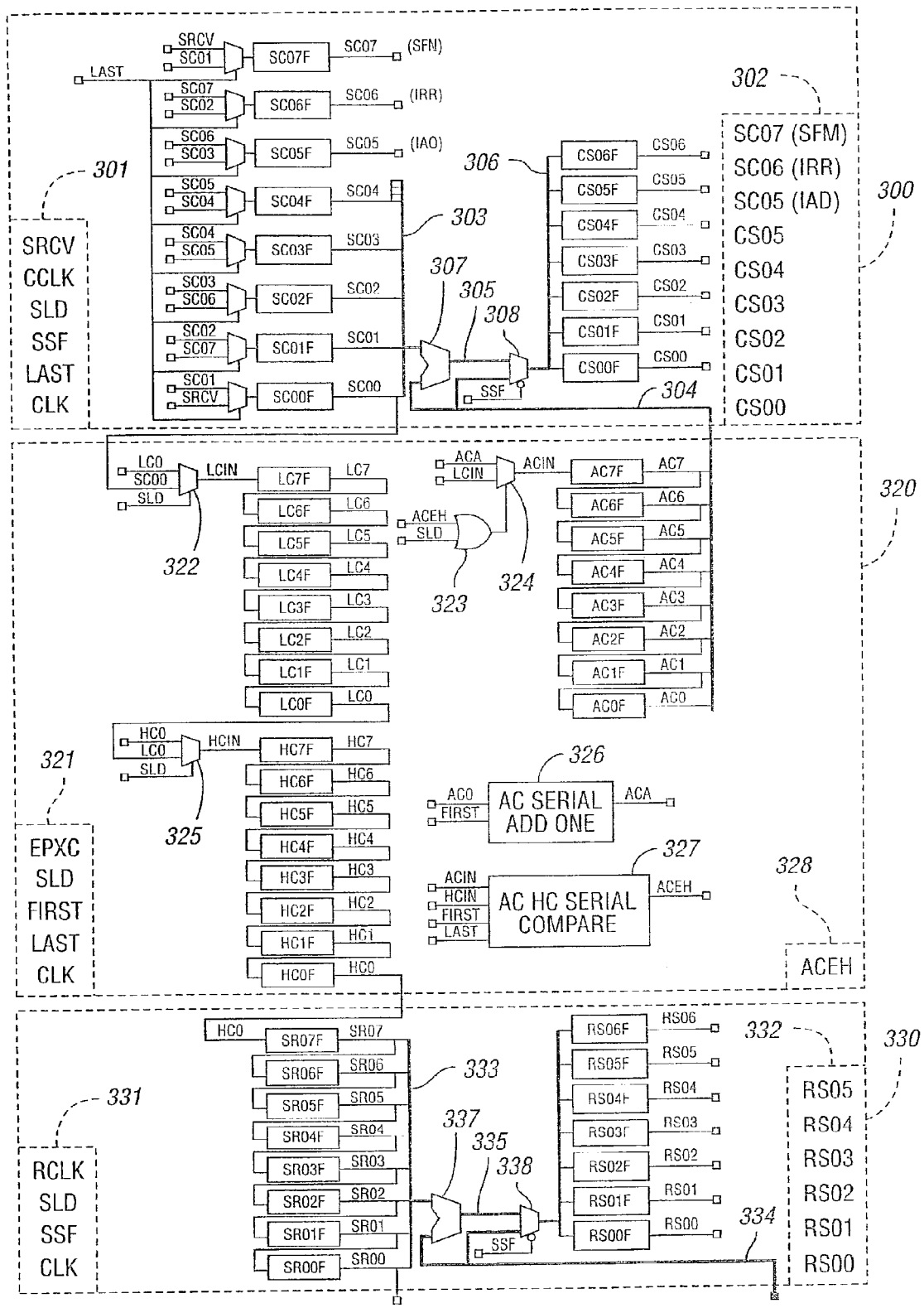
FIGS. 11a and 11b are block diagrams of the registers and the logic used for a portion of the control circuit in accordance with the present invention.
Figure 11B:
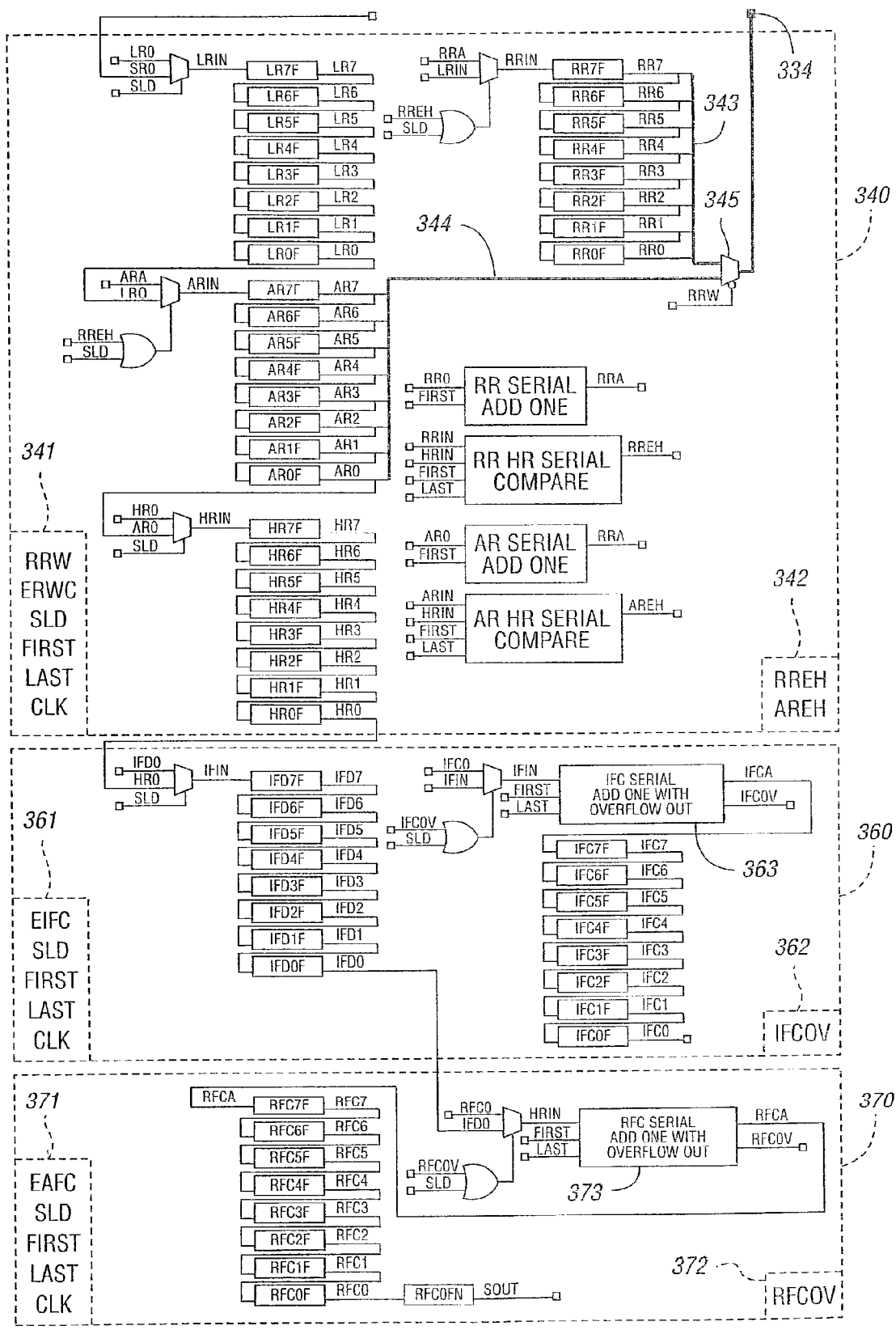

FIGS. 11a and 11b depict the registers and the data paths where the image array sensor instruction data is stored and manipulated for the control of the image array sensor. The overall function of the registers is to generate the sequence of row select and column select addresses required for the dual windowed readout of the sensor and to return status signals which expedite the control of the readout sequence. Blocks 300 and 320 in combination generate the column select address CSO0 through CSO6. Blocks 330 and 340 in combination generate the row select address RSO0 through RSO6. Block 360 counts the number of frames which are added to lengthen the sensor integrating time. Finally, block 370 counts the number of times to read the frame or frame pair to complete the instruction sequence.

There are two general modes of operation for the control circuit. The first is the instruction serial load mode in which the register is serially loaded with 72 bits (9 serially transmitted bytes) of data. The second mode of operation is the instruction execution mode in which the registers are reconfigured and selectively enabled for 8 clock cycle sequences to perform the incrementing, loading, and compare functions required to generate the complicated sequence of addresses and the status indicating outputs required to sequence the controlled windowed readout of the array sensor. The circuit generates binary row and column addresses which are decoded by the array sensor to select the appropriate rows and pixels at the intersection of the selected row and column in order to perform the required control and readout functions.

The control signals input to the blocks 300, 320, 330, 340, 360, and 370 are enumerated in the respective lists 301, 321, 331, 341, 361, and 371 and the signals which are output from these blocks (excluding the interconnections which are shown) are enumerated in the respective lists 302, 328, 332, 342, 362, and 372. Each of the blocks receives a clock signal CLK, a serial load signal SLD, and a signal LAST indicating that this is the last of a group of 8 clock signals for which a particular block or group of blocks is enabled is used by every block except block 330. Each of the 72 rectangular boxes in the groups SCOxF, LCxF, IICxF, SROxF, LRxF, ARxF, HRxF, IFDxF, and RFCxF depict individual clocked D-type flip-flops which have a clock enable. These flip-flops are all enabled and configured generally as one long shift register to load the 72 bit (9 serially transmitted bytes) instruction word. Except for the 8 bit group SCOxF, the remaining eight flip-flop groups are simple 8-bit shift registers each with a clock enable. During the load sequence, SCOxF receives bit 7 through bit 1 of each byte shifting them serially into SCO7F through SCO1F so that just prior to the last of the eight clock pulses which shift in the byte, bit 7 is in SCO1F and bit 1 is in SCO7F. Then, on the last of the eight clock pulses, LAST is asserted directing bit 0 coming in last on SRCV directly into SCO0F and exchanging SCO1F with SCO7F, SCO2F with SCO6F, SCO3F with SCO5F, and leaving SCO4F unchanged. This reverses the order of the bits of the byte so that successive bytes are serially transmitted, least significant bit first from SCO0F to LCIN and the D input of LC7F. This is necessary for the serial add functions performed in blocks 320, 340, 360, and 370. The SCOxF group was placed first because its value remains static like SROxF during the execution phase and is not enabled during that phase. This eliminates the need to further complicate the data selectors which are used to reverse the transmission order from most significant bit first to least significant bit first. The four low order bits SCO0 to SC04 are sign extended by repeating SC04 for the higher order bits of adder 307. This number transmitted on bus 303 is the colunm offset of the second frame relative to the first in signed, twos complement form which is added in adder 307 to the column address for the first frame which is generated in AC0 through AC7 and transmitted on bus 304. The adder output is transmitted on bus 305. The signal SSF is asserted to select the bus 305 to which the second frame offset has been added and gate it to bus 306. When SSF is not asserted, the signal 304 is gated directly to 306 without adding the column offset value. CSOxF is a D type register into which the row address from 306 is clocked by the rising edge of CCLK. The number of bits in the CSOxF register may be changed to accommodate the number of columns of pixels in the sensor. Thirty-two to sixty-four columns and rows are anticipated to be the number required for the headlamp dimmer control and the moisture sensing applications discussed above. The number of bits in the row and column select addresses may be reduced for smaller numbers of rows and columns or increased to eight to accommodate up to 256 rows and or columns with few if any other changes. More rows or columns are within the scope of the invention but will require other adjustments in the word sizes. It is not necessary to stay with a word size of eight, but this is convenient to match the byte size of the words in the microcontroller memory and in the 8 bit word size of the serially transmitted data.

During the serial load stage, data selector 322 routes the output signal SCO0 to LCIN which is the D input to the LC7F flip-flop. Data selector 324 routes the identical bit stream to the D input of AC7F and data selector 325 routes the output of LCOF to the D input of HC7F. At the completion of the instruction load phase, the eight bit registers LCxF and ACxF both contain the address of the starting or low column of the first frame and HCxF contains the address of the last or high column of the first frame. The count in ACxF thus begins at the lowest column address and is incremented until it matches the high column address. On the next pixel count after the high column address is matched, a copy of the low column address is again shifted into ACxF so that the incremental count from the low to the high column address is repeated. Thus, the increment pixel count is a simple serial add one operation until the count equals the high column address and it is then a copy operation of the low column address into the ACxF count register for the next increment operation.

The logic depicted in block 320 is self contained in that it performs the incrementing, the comparing, and the copying as required to produce the sequence described above. It does so in response to a series of eight cycles of the CLK input for which the enable pixel count EPXC input is high. On the first of the eight CLK cycles, FIRST is asserted and is used by the serial add one circuit 326 to force the addition of one to the least significant (first) bit of the ACxF count. The serial add one circuit 326 contains several gates and only one flip-flop to register the carry. The serially incremented output ACA is selected by selector 324 except during the serial load or reset count cycles so that the incremented value appears in ACxF after eight enabled clock cycles. During each of the increment operations, EPXC also enables LCxF and with SLD low, LC0 is routed to LCIN which is the D input to LC7F. Thus, at the end of eight enabled clock cycles, the original contents of LCxF is re-circulated to its starting position so the value of LCxF retains its original low column address. The high column address HCxF is re-circulated in the same way and the new serialized value of ACxF at ACIN is compared in a bit-wise fashion with the serialized high column address at HCIN. The serial compare function is performed by block 327 which contains only two flip-flops and several logic gates. One of the flip-flops keeps track of the bit-wise equality of the count and the high column address while they are serially presented to the comparator and the other is used to assert the ACEH output signal during the next eight clock cycles for which EPXC is asserted after the count in ACxF is equal to the high column address from HCxF. FIRST is used to initialize the serial compare equal indication and LAST is used to signal the required update of ACEH. Note that, in this way, ACEH is asserted for exactly the number of clock cycles needed to copy the low column address into the counter. Also, ACEH is output and fed as an input to the control circuit to signal the end of a row. There is a five pixel pause in the otherwise periodic enabling of the EPXC between rows so that the required row specific functions may be performed. Otherwise, during the entire execution period for the instruction, the column count is regularly incremented whether a pixel value is being read or not so that the pixel count periodically cycles to create the periodic assertion of ACEH which is used to enable the row count which is cycled in a similar fashion to cycle the integration frame count which in turn increments the frame read count until the required number of frames have been read. The CCLK signal is asserted only when the count ACxF is in its rest position between the first and last clock periods of the 8 clock sequence so that the bits registered in the column select register are not shifted to an incorrect position.

Blocks 300 and 320 together generate the column address and are also cycled as just described to establish the periodic row time base. Blocks 330 and 340 perform a similar but not identical function to generate the row addresses and to create periodic frame scan timing signals. The description will be directed to the differences. In the intended application, the second frame column offset is normally small but the second frame row offset is large. Therefore, the full 8 bits of SROxF are used for the second frame row offset. Since the order reversal to low bit first has already been done, SROxF is a simple 8-bit shift register with an enable which is asserted only during the serial instruction load, i.e., when SLD is high. The function of the adder 337 to add the second frame row offset is similar to the function of the related circuit incorporation of block 307 for the second frame column offset and the use of the select second frame SSF signal is similar as is the use of RCLK to register new row select addresses into the RSOxF register. However, timing of when RCLK is asserted to select new rows is quite different. Two separate row select counters are initialized differently but incremented together. Each one is separately compared to the high row address and reset to the low row address during the next 8 cycles of CLK for which the enable row count ERWC signal is asserted. The reset row counter RRxF possibly augmented by the second frame row offset is used to select the row to reset at the beginning of the integration period. The analog to digital row count ARxF is used to select the row to gate to the capacitive holding register for analog to digital conversion of the pixels in the low column to high column range of the readout window. The reset row count RRxF is initialized equal to the low row address so its general configuration is directly analogous to the column count. The analog to digital read row ARxF count is, however, initialized to a value which is specified as part of the load instruction. The value given should be greater than the low row count written to LRxF and less than or equal to the high row count written to HRxF. Each count is individually checked for equality to the high row count when it is loaded and each time that it is incremented and is reset to the low row count during the incrementing operation following the one for which equality to the high row count was detected. The result is that the reset row and analog to digital read row counters follow the same ramp patterns through an identical range of row count values but out of phase with each other. Data selector 345 routes bus 343 from the RRxF counter to bus 334 when the reset row RRW signal is asserted to reset a row at the beginning of the integration period. Otherwise, bus 344 from the ARxF counter is routed to 334 to select a row to read. The reset of successive rows to begin the integration period begins at the beginning of the instruction cycle when the reset row address is equal to the low row address, i.e., at the top of the frame. The reset of rows to begin the integration period, once begun, continues until all of the rows in the frame or pair of frames have been reset. The reset operation is suspended for integral frame periods equal to the number of integration delay frames inserted and continues until the frame or frame pair is reset for the final readout cycle. The readout of rows then begins one or more rows later when the analog to digital row count is set equal to the low row address so that the readout is at the top of the frame. Like the reset process, the readout, once begun, continues to the end of the frame with readout temporarily suspended for added integration delay frame periods. The instruction execution ends just after readout of the last row of the last frame or frame pair is completed.

The IFDxF register is preset to the twos complement of the sum of the number of added integration delay periods and one. That is for no extra delay periods, it is set to −1 in twos complement form and for 2 extra integration delay periods between the reset and the read for each read cycle, it is set to −3 in twos complement form. The value in the IFDxF register is maintained by re-circulating it, as with the low and high column and row count registers. The counter IFCxF is initially loaded to 1 plus the value placed in the IFDxF register and the overflow condition is asserted by making the integration frame count overflow IFCOV high for the next 8 clock cycles for which the enable integration frame count EIFC signal is asserted. As with the previous blocks, EIFC is asserted to increment the count and the assertion of the overflow indication causes a copy of the value from IFDxF to be pre-incremented and copied into IFCxF. The pre-increment function is used so that the overflow condition can occur on the same cycle as the counter is loaded. The assertion of IFCOV is used to signal the end of the integration frame delay period. It is enabled once for each cyclic frame period by asserting the EIFC signal for 8 CLK cycles. The serial add one and overflow detector uses two flip-flops and several logic gates and outputs a serial bit stream at IFCA which is equal to 1 plus the value of the serial bit stream input at IFIN.

The counter 373 in block 370 is set to the negative of the sum of 1 and the number of times to read the frame or frame pair. It is similar to the IFCxF register in block 360 and the register to reset the value is not required since execution of the instruction is ended at the end of the read of the final frame. The end of the read instruction is signaled when the RFCOV overflow condition is asserted and the readout of the block is completed.

As an option, the SOUT signal may be output by the controller and conveniently input to the serial input of the microcontroller during the instruction write phase. The value returned will have each serial byte value incremented by the add one circuit in block 373. With this small change, it is directly determined by the value in the 72-bit register set at the end of the execution of the immediately preceding instruction and thereby constitutes a good diagnostic test point to verify operation of a relatively large percentage of the control logic with very little additional logic. RFCOFN has the same CLK and enable as the RFCOF and has RFC0 as its D input. It is clocked on the negative rather than the positive edge of the clock. The result is that SOUT leads RFC0 by one-half clock pulse and is the proper phase to send back to the microcontroller on the MISO line.

There are a total of 72 flip-flops in the instruction register, 25 additional flip-flops in additional processing registers, 14 flip-flops in the registers which capture and hold the row and column addresses, and 13 flip-flops in the serial add, compare, and overflow functions for a total of 124 flip-flops. The added gating and bussing logic is minimal and the control and serial interface blocks are implemented with a relatively modest number of added parts so that this novel approach turns out to be very efficient in terms of the logic requirement for the function which is performed.

Figure 12A:
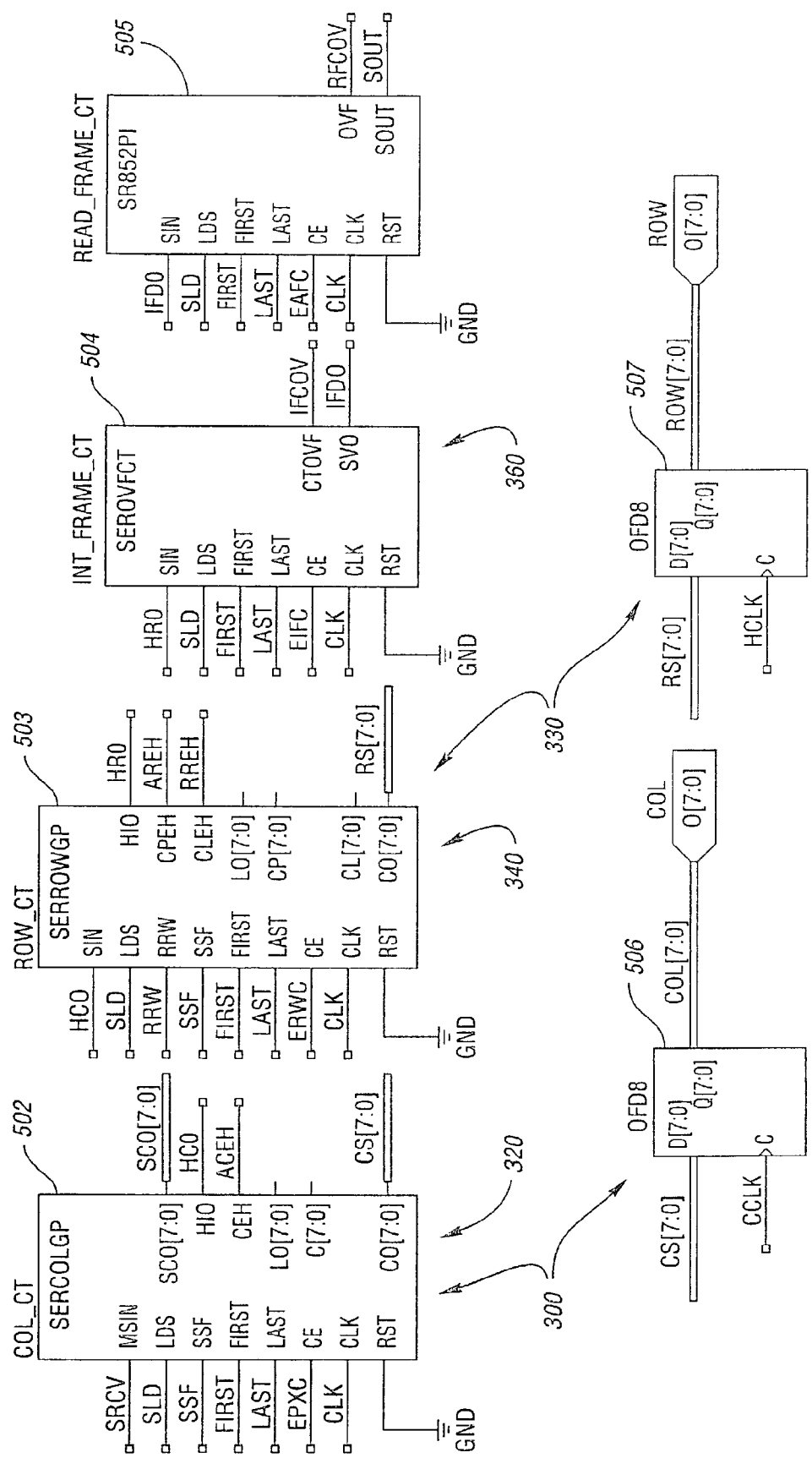
FIGS. 12a and 12b are top level diagrams of the control circuit in accordance with the present invention.
Figure 12B:
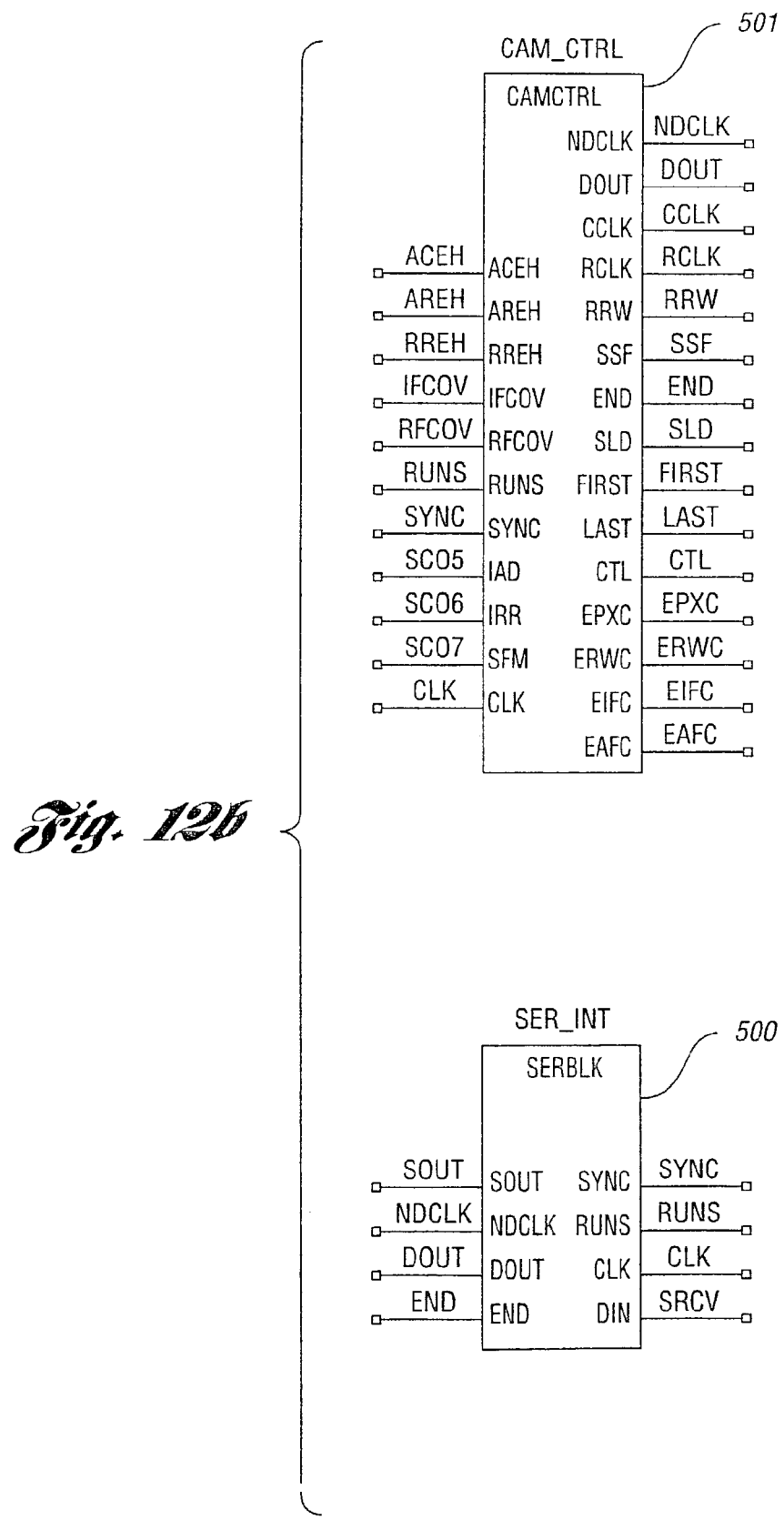
Figure 12C:
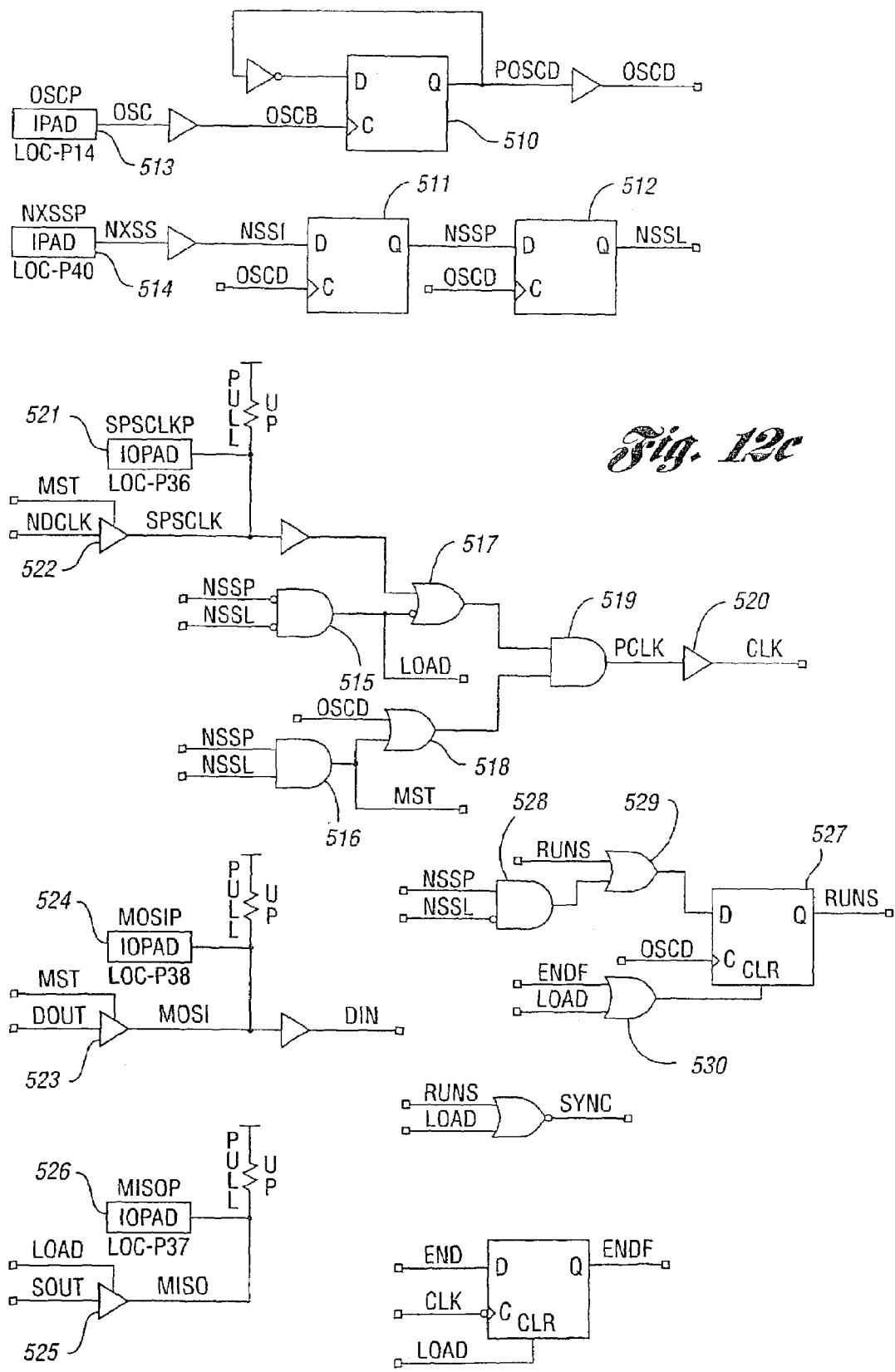
FIG. 12c is a schematic diagram of the SerBlk portion of the control circuit in accordance with the present invention.
Figure 12B:
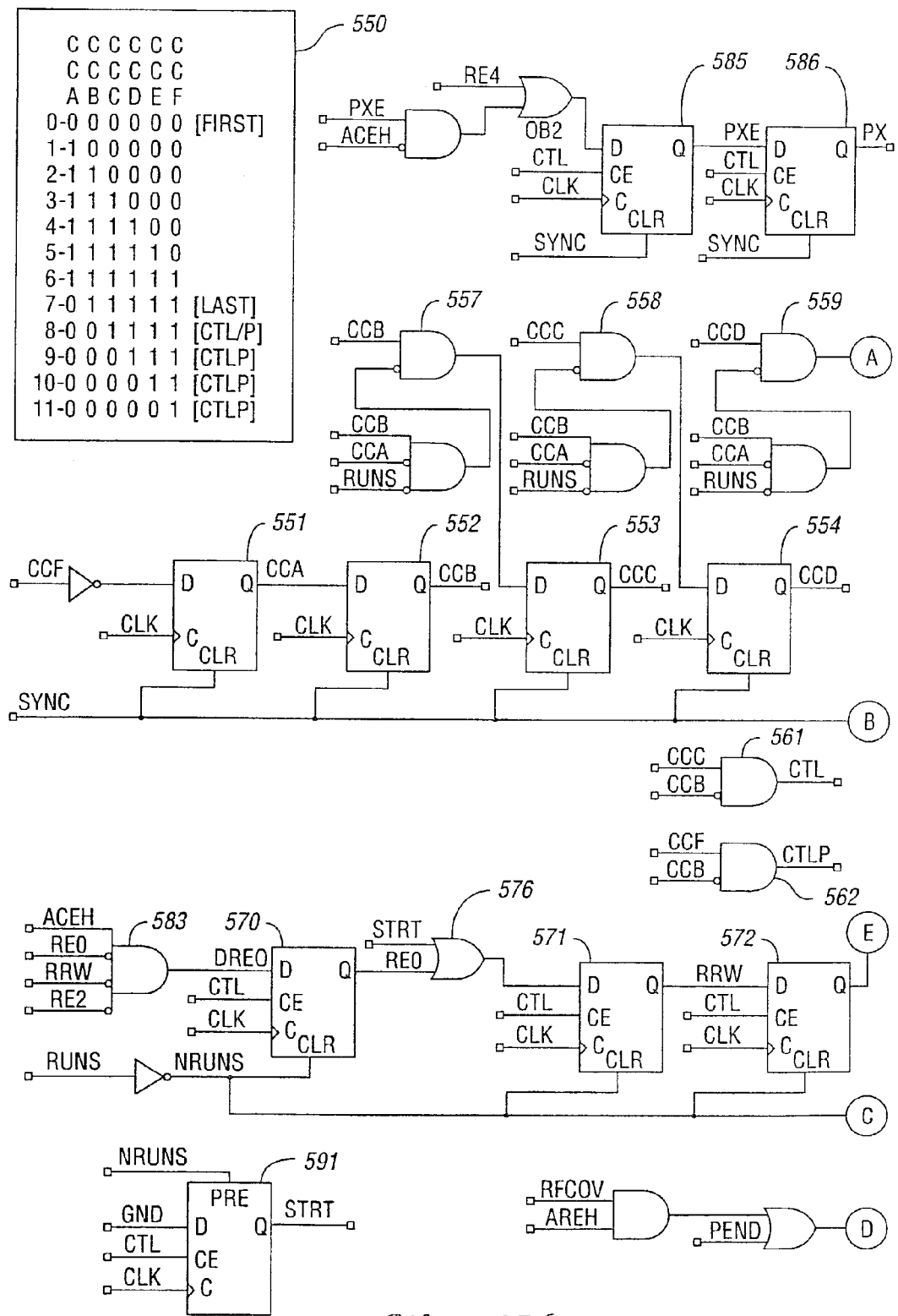

Referring to FIG. 12b, the block 500 detailed in FIG. 12c provides the logic which interfaces with the clock and with the SPI port of the microcontroller 5, for example, a Motorola 68HC708XL36, shown in FIG. 10. The interconnections with the clock and serial port of the microcontroller 5 are shown in block 500 and will be described in the description of the circuit of FIG. 12c.

The block 501 receives SYNC, RUNS, and CLK signals from the block 500 and counter status information from the serially structured instruction queuing and processing blocks 502 through 505, the block 501 responds to these signals by issuing a group of control and logic enable signals which control the overall sequencing of the processing which takes place in the blocks 502 through 507. The block 501 also sends the clock and the combined select and start conversion signals to the charge redistribution analog to digital converter (A/D), for example, an LTC1196. The block 500 inputs and buffers the serial data line from the LTC1196 and sends the buffered serial form of the data signal as DOUT and the associated clock as NDCLK to the microcontroller 5. The blocks 502 through 507 are detailed in FIGS. 11a and 11b in a way which represents the novel serial architecture which serves multiple functions to queue, store, and process the instruction. The architectural details are clearer in this representation than in a conventional set of logic diagrams.

The block 502 is detailed in boxes 300 and 320 in FIGS. 11a and 11b. The flip-flops in block 502 enter and queue three bytes, 24 bits, from the serial instruction word during the instruction entry phase for which SLD is asserted. These bytes are the second frame column offset SCO, the low column LC of the first frame, and the high column HC of the first frame. During the instruction run or execution phase for which RUNS is asserted, this same register set is utilized to generate the appropriate sequence of working column addresses which are latched as required in the block 506. The block 506 is also depicted as the CSOxF flip-flop set in box 300 of FIG. 11a. Bits 0 through 4 of the SCOxF register (i.e., SCO0F, SCO1F, SCO2F, SCO3F, and SCO4F) are used to enter a signed number which designates the column offset of the columns of the second frame relative to the corresponding columns of the first frame. Bits 5, 6, and 7 of this word are used for special purposes. These bits are output from block 502 on the designated lines of bus SC0[7, 0] and input as SC07 (SFM), SC06 (IRR), and SC05 (IAD) to block 501 (Note that these signals go under the SFM, IRR, and IAD designations in FIGS. 12C and 12D). SC07 (SFM) is set in the instruction word to skip processing and readout of the first frame and to process only the second frame of the frame pair. The instruction execution and integration times are shortened because of the roughly halved number of processing steps when SFM is set. SC06 (IRR) is set to inhibit reset of the rows at the start of the integration period and SC05 (IAD) is set to inhibit readout of the rows during execution. Setting of IAD or IRR inhibits the stated function without changing the timing of the instruction execution.

Block 503 is detailed in boxes 330 of FIG. 11a and 340 of FIG. 11b. The flip-flops in block 503 enter and queue four bytes, 32 bits, from the serial instruction word during the instruction entry phase for which SLD is asserted. These bytes are the second frame row offset SRO, the low row LR of the first frame, the initial row count value for the row to read with the A to D converter AR, and the high row HR of the first frame. During the instruction run or execution phase for which RUNS is asserted, this same register set is utilized to generate the appropriate sequence of row addresses which are latched as required in block 507. The block 507 is also depicted as the RSOxF flip-flop set in box 332 of FIG. 11a. The logic generates and latches both the row numbers of the rows to reset at the beginning of the integration period as required and of the rows to read at the end of the respective integration periods.

The block 504 is detailed in box 360 of FIG. 11b. The flip-flops in block 504 enter and queue 1 byte, 8 bits, from the serial instruction word during the instruction entry period for which SLD is asserted. During the instruction run or execution phase for which RUNS is asserted, this byte controls the number of zero or more integration frame delay periods which are inserted between reset of the rows of a frame and their readout to provide more "exposure" time for the pixel sites to accumulate light induced charge.

The block 505 is detailed in box 370 of FIG. 11b. The flip-flops in block 505 enter and queue 1 byte, 8 bits, from the serial instruction word during the instruction entry period for which SLD is asserted. During the instruction run or execution phase for which RUNS is asserted, this byte controls the number of successive readings of the frame or frame pair which are taken and serially returned to the microcontroller as 8-bit digitized readings which indicate the light level received at the respective pixel sites.

FIG. 12*c* is a logic diagram of the circuit which implements block 500 of FIG. 12*b*. In block 500 as in the other blocks in these diagrams, the signal names inside the blocks which are adjacent to a pin are the names used in the sub-block which implements the function, the circuit of FIG. 12*c* in this case. The names on the wiring paths external to the package are the names used for the interconnections at that level. In most cases, the names are identical, but there are some signal name changes from one diagram to another when they are not. For example, the signal name SCO7 of FIG. 12*b* is changed to SFM in block 501 and its associated FIGS. 12*d*-12*g*.

FIG. 12*c* implements the block 500 of FIG. 12*b*. The microcontroller 5 (FIG. 10) is connected to the ASIC XC4003E by 5 signal paths. As will be apparent from the discussion, simple modifications allow this number to be reduced to four, with a fifth connection which may be optionally provided to implement an optional diagnostic check. The serial peripheral interface (SPI) port of the microcontroller 5 consists of four signal connections, three of which are bi-directional lines which are directly interconnected to corresponding pins for each device on the serial SPI bus which, in the present embodiment, consists of only the microcontroller 5 and the ASIC XC4003E.

The three bi-directional bus lines are the master in slave out (MISO), the master out slave in (MOSI), and the serial peripheral serial clock (SPSCLK). Additionally, each device connecting to the port has an active low slave select (SS) input designated SS for the microcontroller and XSS for the ASIC XC4003E. The SS pin to the microcontroller 5 is grounded and this requirement is being met, programming options may be used to place the microcontroller's internal SPI port in either the master or slave mode. The active low XSS pin is driven low by the microcontroller 5 to place it in the slave mode. In a normal instruction to read a frame or frame pair one or more times, the microcontroller 5 places its internal SPI port in the master mode, and places the port of the ASIC XC4003E in the slave mode by driving the XSS line low. The microcontroller 5 then serially transmits the 9 byte, 72 bit instruction to the ASIC XC4003E. In the design shown, if more bits are transmitted, the last 72 transmitted are the ones captured. The instruction bytes are transmitted most significant bit in each byte first and the order first to last is read frame count, integration frame delay, high row, A/D row start count, low row, second frame row offset, high column, low column, and the second frame column offset. During the instruction transmission phase, the master SPI port of the microcontroller 5 drives the MOSI line with the data and the SPSCLK line with the data clock. After the instruction is transmitted, the microcontroller 5 changes its internal SPI unit to the slave mode preparing the program to receive the bytes of pixel data and then drives the XSS line high which places the ASIC XC4003E in the master mode. In response, the ASIC XC4003E enters the RUNS state and transmits the digitized pixel data back to the microcontroller 5 serially as the voltages from the individual pixels are digitized. The ASIC XC4003E then goes into an idle mode until another instruction is received from the microcontroller 5. The ASIC XC4003E is the master and the microcontroller 5 the slave during the RUNS mode so the ASIC XC4003E drives the MOSI line with the data from the A/D readings of the pixels and the SPSCLK line with the data clock. In fact, after the instruction is complete and END is asserted, the ASIC XC4003E continues to drive the SPSCLK and MOSI as a master in the non-transmitting state until the microcontroller 5 drives XSS low. If XSS is driven low before an instruction is complete, it is aborted.

The SPI port of the microcontroller 5 has a number of clock modes, the one used is that for which SPSCLK signal is high in the idle states. A pull-up, programmed in the ASIC XC4003E for the SPSCLK pin, assures that the SPSCLK stays high when neither SPI is in the master mode. The first enabled clock state should be high when either the microcontroller 5 SPI or the SPI in the ASIC is made the master and more than one SPI port should never be made master at the same time. The clock is further configured so that the first transition is the falling edge at which time the data is driven onto the MOSI line. The slave clocks the data in on the subsequent rising edge of the clock. A careful verification that the transition from one clock source to another is made properly in both directions without dropping clocked data bits or introducing unwanted bits should be performed.

During the instruction transmit mode, the ASIC XC4003E drives the MISO line with the data shifted out from execution of the previous instruction. The microcontroller 5 or a separate piece of test equipment may optionally be programmed to read and verify this data as the next instruction is loaded. It constitutes a relatively good check of the function of the ASIC logic and its interconnection with the microcontroller 5 since a large part of the data path and the microcontroller communication on both the sending and receiving end must function properly for the expected 72 bit value to be returned. If the feature is not used, the MISO pin does not need to be connected.

Referring again to FIG. 12*c*, the OSC clock signal is driven by the microcontroller 5 crystal oscillator which for this application is anticipated to be operated in a range of 8 to 16 MHz. However, frequencies from a wide range may be used. OSC enters at pad 513 and the frequency is divided by two producing a 50 percent duty cycle at nominally 4 to 8 MHz at OSCD. OSCD is uninterrupted in normal operation. The active low XSS signal driven from the microcontroller is input at pad 514 and the signal is sampled by a D flip-flop 511 clocked by OSCD to give NSSP, which is the synchronized present look for the XSS input and the value is shifted through flip-flop 512 to give NSSL, which is the last look for the XSS input. When the XSS input has been low for at least two consecutive samples, the LOAD signal from the gate 515 is high. This is equivalent to the slave state for the ASIC XC4003E and MST from gate 516 is low. In this condition, the SPSCLK input from the microcontroller 5 at pin 521 is gated through 517, 519, and clock buffer 520 to drive the main CLK signal for the ASIC XC4003E. Thus, in this mode, the system clock has one positive clock edge for each bit of the instruction word which is serially entered into the MOSI pad 524 of the ASIC XC4003E from the microcontroller 5 and is routed to the DIN pin of the serial interface block 500. As shown in FIG. 12*b*, the data in signal DIN changes name to SRCV at the output pin of block 500 and is routed from the SRCV output pin of block 500 to the SRCV input pin of block 502, which is the input point for the 72 bit long instruction word. In FIG. 12*c*, with LOAD high and MST low, buffers 522 and 523 are disabled so that SPSCLK and MOSI are not driven from the ASIC XC4003E during the LOAD operation. Buffer 525 is driven with LOAD high so SOUT from block 505 in FIG. 12*b* is routed through the SOUT pin of block 500 to drive the MISO return line to the microcontroller 5. In block 505, the signal NSSP is driven by a negative edge triggered flip-flop to establish the proper phase for the data driven onto MISO. When the microcontroller drives XSS from low to high, the signal NSSP is driven high one clock cycle before NSSL so that the output of 517 goes high for one clock cycle. This high is gated through 529 to the D input of 527 which causes RUNS to go high. RUNS remains high due to the feedback path through 529 until 527 is reset by the assertion of another LOAD signal caused by driving XSS low or the normal end of the instruction signaled by the assertion of the ENDF signal in 530. ENDF is set when END is received from block 501 and cleared by the next LOAD instruction. When XSS is driven high, MST is asserted gating OSCD through 518, 519 and 520 to drive the CLK for the ASIC XC4003E. The synchronizing of LOAD and MST to OSCD and the one cycle clock period between the removal of one and the assertion of the other, assures a good clock transition when the SPSCLK from the microcontroller 5 is well behaved. SYNC is asserted whenever either RUNS or LOAD is not asserted and is used for a soft initialization of block 501 particularly to synchronize the byte timing with the bytes in the serial bit stream.

Figure 12E:
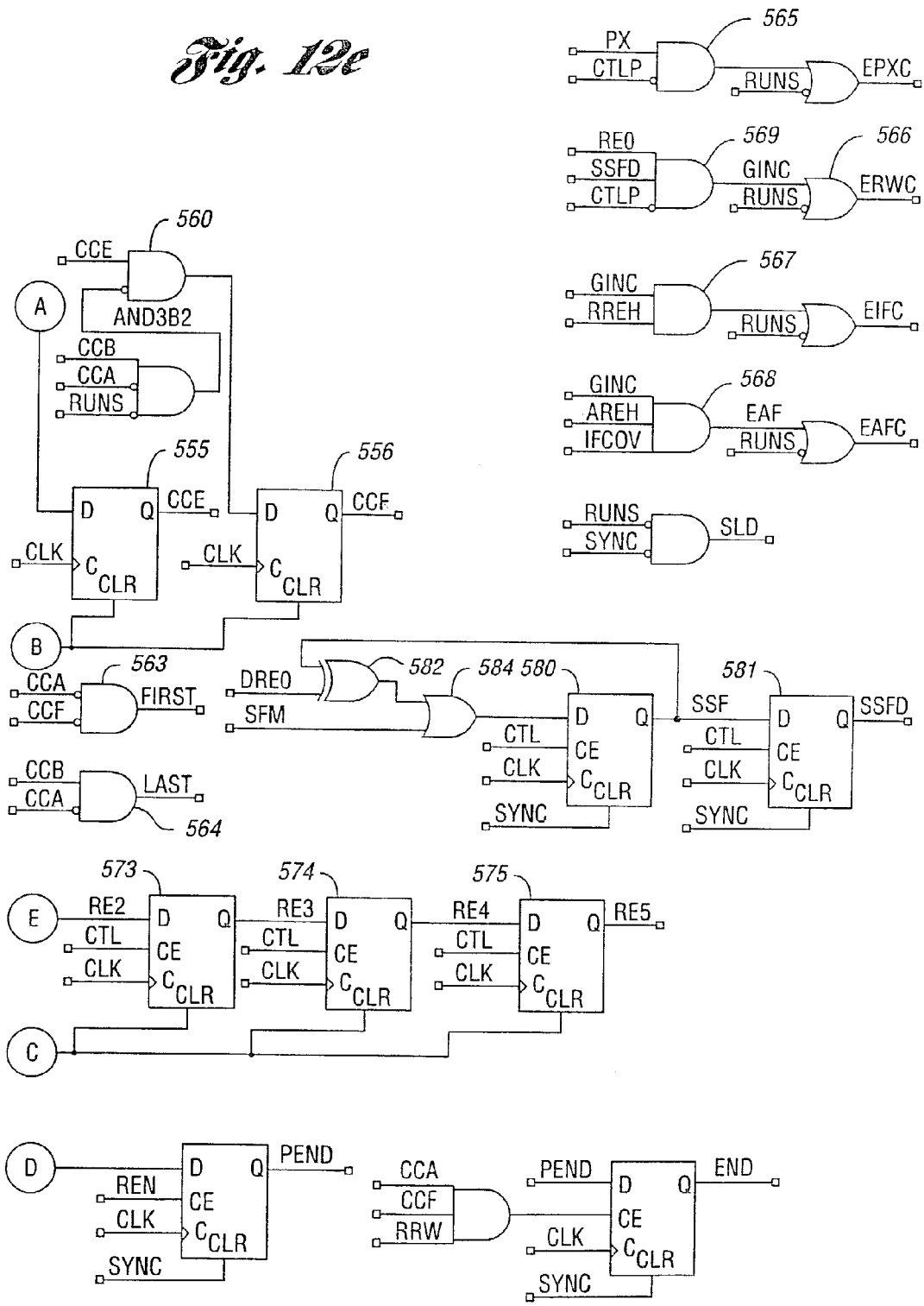

Referring to FIGS. 12d and 12e, six flip-flops 551 through 556 form a Johnson counter which cycles through the 12 count values listed as counts 0 through 11 in table 550. The counter cycles through all 12 states when RUNS is asserted and gate pairs 557 through 560 cause the counter to cycle through the first 8 values listed as 0 through 7 in table 550 during the LOAD cycle when RUNS is not asserted. When neither LOAD or RUNS is asserted, SYNC is asserted clearing all six counter stages and holding it in the 0 state as listed in table 550. FIRST is asserted for the count number 0 which is always the first of the 8 clocks used to serially process information in blocks 502 through 505. LAST is asserted for the count number 7 which is the last of the 8 clocks used to process the information. CTLP is asserted for counts 8 through 11 and is used to inhibit the enable signals used for serial processing whenever these additional count states are used. CTL is asserted for the first of the extra count states for which the register enables are not enabled. This state is one for which all of the serial processing registers are in their normal rest positions and for which the "row equal high," "column equal high," and "overflow" states are asserted. It is the one of the 12 count cycles for which most of the control decisions are made as evidenced by the large number of flip-flops whose enables are driven by this signal. The other three counts 9 through 11 which make up CTLP are provided to provide the 12 clocks per pixel required by the LTC1196 analog to digital converter. The counting scheme could, with substantial modification in the logic, be made to work with only 8 counts or can quite easily be adjusted to any number of 9 or more counts per cycle as required to mesh operation of other devices such as the A to D converter with the operation of the rest of the circuit. During the LOAD stage, no A to D conversion is being performed and no specialized processing decisions are being made and, furthermore, the CLK is derived directly from the serial input clock so there is precisely one clock per bit. This is the reason that gate pairs 557 through 560 are provided to cycle the counter through 8 counts per byte during the serial load stage. The generation of the FIRST and LAST bit indicators continue to be properly generated and are used in the serial instruction load operation.

During the RUNS phase, a pause of five pixels duration is added at the beginning of the processing of each row. (The pause is a little shorter before the first row is processed.) This is done to provide time to perform the row reset at the start of the integration period for each row which is read and to generate the sequence of signals to gate values representative of the pixel readings for each row to holding capacitors at the beginning of the readout sequence for the row. A row of flip-flops 570 to 575 is configured generally as a shift register and a 1 is shifted through a field of zeros, the shift taking place on the clock for which the CTL signal enable referred to above is asserted.

STRT is asserted at the beginning of a RUNS instruction by being set when RUNS is low. It causes flip-flop 591 to be set for one pixel period at the start of the RUNS sequence and this one pixel wide assertion ripples through the flip-flops 571 through 575. The assertion of RE4 causes flip-flop 585 to be set asserting PXE and a feedback of PXE causes this signal to persist until the end of the row is signaled by the assertion of ACEH from the column processing block 502. The assertion of ACEH indicates that the last column in the row is being processed. Flip-flop 586 inserts a one pixel width delay before assertion of PX. Gates 565 assert EPXC for the required 8 clock periods out of every 12 clock period pixel time; that is, for the 8 of the 12 clock periods for which CTLP is not asserted. EPXC is used by block 502 to increment to the next column position. When RUNS is not asserted, EPXC is continually asserted to enable the block 502 during the instruction entry period when LOAD is asserted ERWC is asserted by gate 566 to increment to the next row at the beginning of the between row period when RE0 is asserted and only after a row of the second of the two frames has been processed as indicated by the requirement for SSFD to be asserted. Again, ERWC is asserted only during the 8 of the 12 clock periods when CTLP is not asserted. ERWC is also asserted during the LOAD when RUNS is not asserted. Note that when one frame only is processed, it is the second frame so ERWC is asserted at the end of every row. The gating of ERWC when RUNS is asserted is determined by gate 569 and is broken out as signal GINC which is additionally restricted to enable the integration frame count EIFC only when at the end of the last row and at the end of the row reset frame for which RREH is asserted. The read frame count is incremented only at the end of a read frame when AREH is asserted and additionally the integration frame count is complete as indicated by IFCOV being asserted. EIFC and EAFC are both asserted during the load period when RUNS is low.

SLD is asserted when neither RUNS nor SYNC is asserted indicating that an instruction is being loaded. Pre-end PEND is asserted when the required number of frames has been read as evidenced by RFCOV being asserted along with AREH being asserted indicating that the last row of the last read frame set has been reached. The additional flip-flop asserts END after PEND is asserted and after the time has been provided to complete the final A to D conversion and sends the serial data to the microcontroller 5. The timing here is fairly critical because too many or too few pixel clocks will cause a framing error on the serial transmission of the pixel readings to the microcontroller.

The flip-flop 580 registers the select second frame SSF indication. This indication is used by blocks 502 and 503 of FIG. 12a and also in the logic of FIGS. 12 and 12e under discussion here. When SSF is asserted, the second column and second row offsets are added to the base row and column selections to process data in the second frame. In the normal mode when SFM is not asserted, SSF is held at 0 and the row of the first frame is processed, then without changing the base row value, SSF is asserted and the corresponding row of the second frame is processed. In this way, processing of corresponding rows of the two frames is interleaved and the time skew between the processing of the corresponding rows is short, being equal to the time to process one row of one of the two frames. One of the intended applications of the dual frame is to project two images which are substantially the same except for the color filtering with each having substantially the same position on its one of the two frames. Here, the effects of motion and of time varying intensities are minimized by minimizing the time lapse between reading of corresponding images. Here, note that an option which retains many of the features of the serial architecture of this invention is to separate the two frames, driving them in parallel as one frame with a possible registration offset applied to one of the two. Then, the readout would also be paralleled and the overall row scan sequence would look more like that for scanning of a single frame.

In FIG. 12e, when the select second frame mode SFM is asserted, gate 584 causes SSF to be set continually so that the column and row offsets are added throughout the instruction and only rows of the second frame are processed. In the normal dual frame mode when SFM is not asserted, exclusive or gate 582 toggles the setting of 580 and thus of SSF at the beginning of each row except the very first when signal 583 DRE0 is asserted. Flip-flop 581 outputs a signal SSFD which is SSF delayed by one pixel period. This delayed signal is useful in some of the logic operations, for example, in gate 566.

Figure 12G:
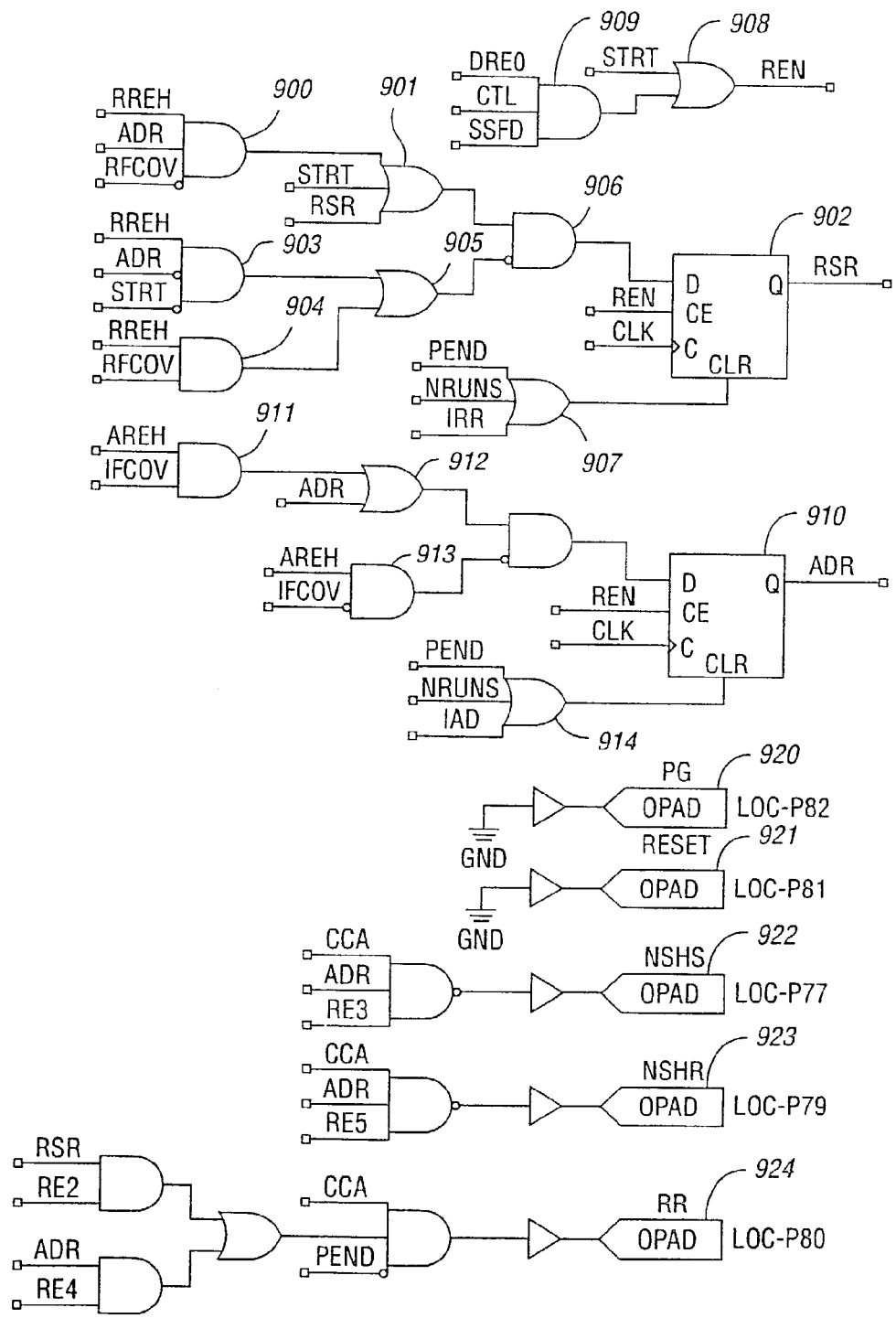

Referring to FIG. 12g, flip-flop 902 registers RSR, which is asserted during the frame processing intervals for which the rows are reset to begin the integration period. Flip-flop 910 registers ADR which is asserted during the period that each row is read. Gates 908 and 909 assert REN to enable the flip-flops controlling RSR and ADR to register a new, possibly changed, setting. REN is asserted at the very start of the instruction execution period when RUNS is asserted and STRT is still high and also at the coincident condition of the CTL clock period, the start of a new row as indicated by assertion of DRE0, and the completion of the processing of the row of the second frame as indicated by the assertion of SSFD.

RSR is set when STRT is asserted at the beginning of instruction execution and at the coincidence of the beginning of a new integration row reset frame (RREH is asserted for the end of the previous frame), while the readout of the frame is being completed (ADR is asserted), and there is another frame to read (RFCOV is not asserted). RSR is reset at the coincidence of conditions when the end of a reset frame is reached (RREH is asserted), a frame readout is not in progress (ADR is not asserted) and STRT is not asserted. RSR is held reset when the last row of the final read is in progress (PEND is asserted), or when an instruction is not being executed (NRUNS is asserted), or the reset of rows at the beginning of the integration period is inhibited (IRR is asserted).

ADR is asserted at the coincidence of the beginning of a read frame (AREH is asserted) and no more integration frame periods remain (IFCOV is asserted). ADR is reset at the coincidence of the conditions, the beginning of a read frame (AREH is asserted), and an integration frame delay period remains (IFCOV is not asserted). As with RSR, ADR is reset if PEND or NRUNS is asserted. ADR is not reset by the assertion of IRR but is reset by the assertion of inhibit A/D reading (IAD is asserted). Pads 920 through 924 are provided for interconnection with the Photobit active pixel sensor which has photodiode photosites. The PG pad 920 is grounded for the photodiode version, the drive for which is illustrated but would have logic attached to generate an appropriate control pattern for an alternative photogate version of the sensor. A general reset is not implemented in the example, the row by row reset being used so RESET pin 921 is grounded.

To reset a row, the number of the row to be reset is latched into the row select register block 507 of FIG. 12a by the positive edge of RCLK. The outputs of this register attach directly to the row select pads 18, 19, 20, 23, 24, 25, and 26 of the ASIC XC4003E and will be routed to the corresponding row select pins on the image array sensor 3. The row select is latched and after a settling time, the row reset RR signal is asserted on pin 924 which connects to the corresponding reset row input of the image array sensor 3. The reset row RR signal is asserted to reset rows at the beginning of the integration period and also to reset a. row as a part of the readout process so that differential readings of pixel voltages are taken by registering the pixel voltage on one of the sampling capacitors following the integration period, then resetting the row and registering the voltage on the second capacitor of the pair. One such capacitor pair is provided for each column of pixels and the column select function gates the voltages on the sampling capacitor pair for the selected column to the differential input of amplifier AD830 of FIG. 10. The process just described nulls out systematic reading errors caused by varying zero reading voltages when the pixels are reset.

Note that there are two different row addresses which must be asserted in quick succession, one of which is for the row to reset at the beginning of the integration period. This is done during one of the five pixel periods at the beginning of the row for which RRW is asserted. RRW is used by the logic of FIGS. 12d and 12f and also is routed to block 503 of FIG. 12a to select the proper one of the reset row and the A to D read row addresses. The reset row address is selected to be latched into row select register 507 only when RRW is asserted, the row address for the A to D readout being selected otherwise.

CCA is asserted during 6 consecutive clock periods of the 12 making up the cycle of the pixel clock. CCA is asserted approximately 4 CLK cycles after any preceding row and column clocks and returns to zero about 2 clock periods before any following row or column clocks making it a good signal to use to gate NSHS, NSHR, and RR so that the row and column selections are stable when these signals are asserted.

The NSHS is an active low signal which gates signals from the selected row to holding capacitors for readout in the image array sensor 3. NSHS is asserted to read a row during the preprocessing period for the row when RE3 and CCA are asserted. The reset row RR is asserted during the next pixel period when RE4 and CCA are asserted. Then the active low signal NSHR is asserted to gate the readings after the row is reset from the selected row to the second set of holding capacitors so that the differential reading can be taken as described above. NSHR is asserted for the reset row reading on the next pixel period when RE5 and CCA are asserted. Following this preparatory sequence at the beginning of the row readout, the column count is indexed from the first to the last column of the selected row gating the holding capacitor voltages for the pixel in the selected column to differential amplifier U6 where the difference between the normal and the reset pixel readings is amplified and buffered and routed to the input of a, for example, Linear Technology Model No. LTC1196 analog to digital converter.

Referring to FIG. 12f, flip-flop 930 cycles RCLK high for one clock period following the one for which CTL is asserted to clock the reset row value into the row output register when RSR and RRW are both asserted. RCLK is cycled high in a similar way to clock the row to read into the output register when ADR and RE2 are both asserted. Similarly, 931 cycles CCLK high for one clock period following the one for which CTL is high when ADR and PXE are both asserted indicating that the frame is being read and that pixels of the row are being converted.

CCLK is asserted only when the new column address is clocked to the output register to output it to the Photobit sensor to select the proper pixel for readout. Thus, CCLK also serves to signal the start of the analog to digital conversion process. Flip-flop 932 serves as a pulse stretcher and CCLKP lasts for 11 clock cycles initiated by and immediately following the CCLK pulse. Flip-flop 933 effectively delays CCLKP and generates the active low signal NCS which is output on pad 938 of the ASIC XC4003E and routed to the combined chip select and start conversion pin of the LTC1196 analog to digital converter. The system clock CLK is routed to the LTC1196 via pad 937 of the ASIC XC4003E and converted data is returned to pad 939 of the ASIC XC4003E and clocked into flip-flop 935 on the positive clock edge. This serves to reestablish the data transmission timing relative to CLK and NDCLK derived from gates 936 and supplies the 8 clock pulses transmitted with the data and ultimately used to clock it into the SPI port of the microcontroller.

Obviously, many modifications and variations of the present invention are possible in light of the above teachings. Thus, it is to be understood that, within the scope of the appended claims, the invention may be practiced otherwise than as specifically described above.

The invention claimed is:

1. An imaging system, comprising:
   an image sensor comprising an array of pixel sensors;
   a controller operative to generate instructions for the imaging system;
   a serial bus coupled to the controller; and
   a control system in communication with the sensor, the control system coupled to the controller through the serial bus, the control system responsive to the instructions that are received from the controller through the serial bus to determine row and column address control signals for the array of pixel sensors, said control system comprises:
   a control logic circuit coupled to the controller through the serial bus for receiving instructions from the controller,
   a programmable row-column and timing controller serial processor coupled to the control logic circuit and to the image sensor for controlling the image sensor in response to commands received from the control logic circuit, and
   an amplifier for amplifying data read from the image sensor and an analog-to-digital converter for digitizing data read from the image sensor,
   wherein the image sensor, the control logic circuit, the programmable row-column and timing controller serial processor, the amplifier, and the analog-to-digital converter are all provided in a common integrated circuit.

2. The imaging system as defined in claim 1, wherein the array has a row input for a selecting row address and a column input for a selecting column address, and wherein the row and column address control signals determined by the control system include the selecting row address and the selecting column address.

3. The imaging system as defined in claim 1, wherein a value determined from a previously executed instruction is communicated from the control system to the controller via the serial bus.

4. The imaging system as defined in claim 1, wherein pixel data is communicated from the control system to the controller on the serial bus.

5. The imaging system as defined in claim 1, wherein the controller is a microcontroller.

6. The imaging system as defined in claim 1, wherein the controller is a microprocessor that is coupled to a headlamp control unit to control headlamps of a vehicle in response to information obtained from the image sensor.

7. The imaging system as defined in claim 1, wherein the serial bus is a bi-directional serial bus and the control system supplies data read from the image sensor to the controller through the serial bus in response to instructions received from the controller over the serial bus.

8. An imaging system comprising:
   an image sensor comprising an array of pixel sensors;
   a controller operative to generate instructions for the imaging system;
   a serial bus coupled to the controller; and
   a control system in communication with the sensor and coupled to the controller through the serial bus, the control system comprising:
   a bi-directional interface for providing a bi-directional serial communication interface with the controller through the serial bus for sending and receiving data from the controller,
   means for controlling the sensor, and
   means for receiving serial instruction words from the controller for controlling the mode of operation of the sensor,
   wherein the means for controlling the sensor controls a mode of operation of the sensor by setting the sensor in a single window mode in response to a first instruction received from the controller and by setting the sensor in a dual window mode in response to a second instruction received from the controller.

9. The imaging system as defined in claim 8, wherein the controller is a microcontroller.

10. The imaging system as defined in claim 8, wherein the means for controlling includes a programmable row-column and timing controller serial processor.

11. The imaging system as defined in claim 8, wherein the means for receiving and the bi-directional interface constitute portions of a control logic circuit.

12. The imaging system as defined in claim 8, wherein the control system further includes an amplifier for amplifying data read from the image sensor.

13. The imaging system as defined in claim 8, wherein the control system further includes an analog-to-digital converter for digitizing data read from the image sensor.

14. The imaging system as defined in claim 8, wherein the image sensor and the control system are provided in an integrated circuit.

15. The imaging system as defined in claim 8, wherein the control system supplies data read from the image sensor to the controller through the serial bus in response to instructions received from the controller over the serial bus.

16. The imaging system as defined in claim 8, wherein the controller is a microprocessor that is coupled to vehicle equipment to control the vehicle equipment in response to information obtained from the image sensor.

17. The imaging system as defined in claim 8, wherein the means for controlling the sensor controls a mode of operation of the sensor in response to an instruction received from the controller by setting a window size of the sensor.

18. The imaging system as defined in claim 8, wherein the means for controlling the sensor controls a mode of operation of the sensor in response to an instruction received from the controller by setting the sensitivity of the sensor.

19. The imaging system as defined in claim 8, wherein the means for controlling the sensor controls a mode of operation of the sensor in response to an instruction received from the controller by setting the frame read repetition timing.

20. An imaging system comprising:
    an image sensor comprising an array of pixel sensors;
    a controller operative to generate instructions for the imaging system;
    a serial bus coupled to the controller; and a control system in communication with the sensor and coupled to the controller through the serial bus, the control system comprising:

a bi-directional interface for providing a bi-directional serial communication interface with the controller through the serial bus for sending and receiving data from the controller, means for controlling the sensor, and means for receiving serial instruction words from the controller for controlling the mode of operation of the sensor, wherein the means for controlling the sensor controls a mode of operation of the sensor in response to an instruction received from the controller by setting the number of frames to be read, and wherein the number of frames to be read is greater than one.

21. The imaging system as defined in claim 20, wherein the controller is a microcontroller.

22. The imaging system as defined in claim 20, wherein the means for controlling includes a programmable row-column and timing controller serial processor.

23. The imaging system as defined in claim 20, wherein the means for receiving and the bi-directional interface constitute portions of a control logic circuit.

24. The imaging system as defined in claim 20, wherein the control system further includes an amplifier for amplifying data read from the image sensor.

25. The imaging system as defined in claim 20, wherein the control system further includes an analog-to-digital converter for digitizing data read from the image sensor.

26. The imaging system as defined in claim 20, wherein the image sensor and the control system are provided in an integrated circuit.

27. The imaging system as defined in claim 20, wherein the control system supplies data read from the image sensor to the controller through the serial bus in response to instructions received from the controller over the serial bus.

28. The imaging system as defined in claim 20, wherein the controller is a microprocessor that is coupled to vehicle equipment to control the vehicle equipment in response to information obtained from the image sensor.

29. The imaging system as defined in claim 20, wherein the means for controlling the sensor controls a mode of operation of the sensor in response to an instruction received from the controller by setting a window size of the sensor.

30. The imaging system as defined in claim 20, wherein the means for controlling the sensor controls a mode of operation of the sensor in response to an instruction received from the controller by setting the sensitivity of the sensor.

31. The imaging system as defined in claim 20, wherein the means for controlling the sensor controls a mode of operation of the sensor in response to an instruction received from the controller by setting the frame read repetition timing.

* * * * *